United States Patent [19]
Skupin et al.

[11] Patent Number: 6,097,993
[45] Date of Patent: Aug. 1, 2000

[54] METHOD AND APPARATUS FOR THE REPEATABLE DOSAGE OF FLUIDS

[75] Inventors: Konrad Skupin, Battenberg; Peter Schumacher, Ahlen; Guido Wiesendahl, Herdecke; Eugen Weidner, deceased, late of Iserlohn, by Margitta E. I. Weidner, legal representative; by Ulirike E. M. Olszewski, legal representative, Altena, all of Germany

[73] Assignee: KLUDI-Armaturen Scheffer Vertriebs-und Verwaltungs oHG, Menden, Germany

[21] Appl. No.: 08/975,761

[22] Filed: Nov. 21, 1997

[30] Foreign Application Priority Data

Nov. 22, 1996 [DE] Germany ................ 196 48 4936

[51] Int. Cl.$^7$ .............. G06F 19/00; G06F 17/60
[52] U.S. Cl. ........................ 700/240; 222/47
[58] Field of Search ................ 222/20, 40, 52, 222/55, 59, 71, 630, 631, 255, 263, 282, 335, 394; 700/231, 232, 239, 242, 244, 240

[56] References Cited

U.S. PATENT DOCUMENTS

| | | | |
|---|---|---|---|
| 4,276,999 | 7/1981 | Reichenberger | 222/129.4 |
| 5,695,092 | 12/1997 | Schrandt | 222/1 |
| 5,816,448 | 10/1998 | Kobold | 222/36 |

Primary Examiner—William Grant
Assistant Examiner—Kidest Bahta
Attorney, Agent, or Firm—Perman & Green, LLP

[57] ABSTRACT

A method and an apparatus for a repeatable dosing or metering of fluids and in particular liquids in a selectable and reproducible amount in which the fluid amount to be dosed is learned in a dosing operation effected manually once and stored in a retrievable way; the apparatus comprises a fluid line 2 for a fluid 1 including a fluid inlet 3 and a fluid outlet 4 between which a shut-off device 7 controlled by a control unit 8 is provided, an operation 5 and a memory input 9 a learning mode is initiated and that by once pre-dosing a corresponding quantity information is stored and that by operating the memory input 9 a dosing mode is initiated in which the fluid amount corresponding to the stored quantity information is dosed by the shut-off device.

55 Claims, 15 Drawing Sheets

(A)

(B)

(A)

(B)

METHOD AND APPARATUS FOR THE REPEATABLE DOSAGE OF FLUIDS

FIELD OF THE INVENTION

This invention relates to a method and an apparatus for the repeatable dosing or metering of fluids, and more particularly for the repeatable dosing or metering of fluids in selectable and reproducible amounts.

BACKGROUND OF THE INVENTION

The dosage, i.e., the quantitative metering, of fluids from fluid sources and in particular the dosage of liquids from reservoirs, containers, vessels, conduit systems and other liquid sources by means of a shut-off device as such corresponds to the state of the art which has been known for a long time. Examples therefor are the filling of vessels with predetermined amounts of gases or liquids, the feeding of dosed fluid amounts into conduit systems or the free discharge of fluids from a fluid outlet, for example, the outflow of liquids such as water from an outlet tap or battery for rinsing or washing purposes.

Typical examples for conventional dosing systems in which mostly predetermined fluid amounts are metered or dosed, are to be found in washing machines and dish washers which are automatically filled with a predetermined amount of liquid, in washing and flushing systems, such as for water closets and urinals, in amount-limiting systems such as for showers and wash-bowls which are particularly used in railroads, in ships and airplanes, bottle and vessel filling machines, irrigating plants and automatic beverage dosing machines as well as for many other uses in the field of household, domestic appliances, sanitary techniques, food stuff technology, chemical technology (e.g., for dosing predetermined amounts of reactants or solvents for carrying out chemical reactions, for carrying out mixing and dosing procedures), and many others.

According to the state of the art the reproduction of a fluid amount is carried out in its simplest form by operating a shut-off device, such as a water tap, by an operator, i.e., by opening and subsequent closing after the outflow or delivery of a predetermined desired amount which may be determined via the mass, the weight, the volume, the level as well as via analogous variables.

The filling of a cooking pot or a bath tub with water are typical, common examples for such a dosing to be carried out directly by a person himself, with the dosed amount being individually determined, and being reproduced individually.

The simplest constructions of automatic dosing systems like the above-indicated systems are based on an allocation of flow rate and time: the fluid amount to be reproduced corresponds to an allocated open time of a time-controlled shut-off device. Examples therefor are automatic drink dispensers delivering, upon operation of operating means, selectable predetermined and reproducible liquid amounts.

However, the accuracy of these time-controlled dosing systems is dependent on how constant and reproducible the flow rate from the fluid source through the shut-off device can be kept.

On account of the influence of pressure variations, temperature variations, and thus, density variations, variations of the cross section, for instance by depositions such as calcification etc., alterations of the opening and closing time of the shut-off device caused by drift effects of the electric or electronic driving as well as by a mechanical play, of a changed pressure drop at the outlet and similar effects, time-controlled dosing systems are not particularly precise, and, above all, in respect of the dosed amounts they are not constant in time. In addition thereto, the selection of amounts to be dosed though a corresponding time setting cannot be easily carried out by an operator. For this reason, in drink dispensers only a few preset liquid discharge amounts are usually provided by the producer which are selectable but not changeable.

The closing operation of the shut-off device (which, for instance, had been opened by an operator or automatically) may be controlled via a detection of the level within the vessel to be filled which may be carried out for instance mechanically by means of floats, the hydrostatic pressure, acoustically by means of acoustic or ultrasonic detectors, respectively, or optically.

The accuracy of volumetric dosing is especially limited because of the temperature dependence of the fluid density.

In addition, also the mass or weight corresponding to a given level or volume amount may be determined.

More complicated and more accurate dosing systems are based on a direct measuring detection of a fluid amount flown through a flow meter and the closing of the shut-off device when a predetermined fluid amount has been reached. In this technical field, apart from mechanical flow meters, magneto-inductive flow meters, vortex (Karman) flow meters, ultrasonic flow meters and mass (Coriolis) flow meters are mainly used.

From DE-A-35 18 645 and from patent application DE-A-35 46 550 divided out therefrom a method and a circuitry for the control of sanitary mixer batteries for cold and warm water are known, by means of which the temperature of the mixed water is controlled with the flow rate of the mixed water being maintained constant.

Therefor, at least two set values serving for the electromechanical setting of the cold and warm water supply are derived from the difference between theoretical and actual temperature such that the resulting flow rate is maintained constant.

From the partial flow rates which are proportional to the corresponding set values an instantaneous cumulative filling amount may be determined by integration which is then compared with a preselected, predetermined cumulative filling amount; the dosing will be terminated when the instantaneous cumulative filling amount corresponds to the preselected cumulative filling amount.

In this previously known liquid dosing system a selected cumulative filling amount, i.e., the total amount of the liquid mixture to be dosed, may be fed into the system and retrievably stored therein.

According to this previously known technique the information on the cumulative filling amount to be stored therein, if necessary, will directly be input as an amount information through input means by an operator. Preferably, standard values are stored for the cumulative filling amount.

As far as the storage of the information on the total amount to be dosed is concerned, this previously known dosing system in principle differs for instance from the known drink dispensers reproducibly delivering fixedly predetermined liquid amounts, only in that the total amount of liquid to be dosed reproducibly may be freely selected and input by an operator.

However, up to the present, there are no dosing systems known allowing a free selection of a fluid amount to be dosed repeatably, which may be easily input or adjusted and be easily changed, and allowing the repeated reproducible delivery of this fluid amount without the necessity to enter this amount quantitatively in the sense of a corresponding input of a respective absolute value (e.g., in liters, kilogrammes, etc.).

Apart therefrom, in the state of the art there are not existing systems, which, beyond the above-indicated storability and requestability of constant delivery amounts of fluid, would be able to learn the storage information from an optional, once "predosed" fluid amount and thereupon reproducibly deliver that fluid in an amount corresponding to the stored information in a repeatable manner.

SUMMARY OF THE INVENTION

The present invention starts from the above-described state of the art according to DE 35 18 645 and DE 35 46 559, respectively.

It is therefore the underlying problem of the present invention to provide a method and an apparatus for the repeatable dosing or metering of fluids in selectable and reproducible amounts, wherein the fluid amount to be dosed is not entered as such in any quantified form by an operator, but is learned and requestably stored on the basis of one single dosing procedure which has been executed manually.

Already this problem is novel in respect of the state of the art.

The above problem is solved according to the independent claims. The dependent claims relate to preferred embodiments and developments of the concept of the invention.

Correspondingly, the invention relates to a learning dosing system.

The method according to the present invention for the repeatable dosage of a fluid in a selectable and reproducible amount by means of a shut-off device provided in a fluid line comprising a fluid inlet and a fluid outlet and being controllable by an electronic control unit which, upon input of an input information corresponding to the selected amount of fluid to be dosed, opens the shut-off device and closes it again after the selected amount of fluid, which is stored as corresponding amount information in the control unit, has been discharged from the fluid outlet, is characterised in that (A) for producing the amount information stored in the control unit a learning mode of the control unit is initiated by putting in an input information to the control unit or by effecting the opening of the shut-off device by an operator, the control unit detects and stores during the learning mode the amount of fluid discharged from the fluid outlet as an amount information corresponding to that amount, and the learning mode is terminated by the control unit through the subsequent closing of the shut-off device effected by an operator, and (B) for repeatably dosing the fluid in an amount corresponding to the amount information stored in the control unit a dosing mode of the control unit is initiated by putting in an input information to the control unit, optionally in combination with an operation of the operation means, thereupon the shut-off device is opened by the control unit, the control unit again closes the shut-off device if an amount of fluid has been discharged from the fluid outlet which corresponds to the respective amount information stored in the learning phase, and the dosing mode is terminated with the closing of the shut-off device.

In the simplest embodiment the amount information is produced via a time measurement of the time period between the opening and the closing of the shut-off device, i.e., at constant or approximately constant flow rate or pressure of the fluid.

According to a preferred manner of implementation of the method the amount information is generated by means of a flow rate measurement by measuring the flow rate of the fluid through the fluid line between the opening and the subsequent closing of the shut-off device.

According to a further preferred embodiment the amount information is generated by correcting the signals or data corresponding to the flow time or flow rate regarding the temperature and/or the density and/or the viscosity and/or the pressure of the fluid.

The amount information may advantageously be determined by the control unit in the form of a relative amount or in the form of an absolute amount and may be printed out and/or displayed optically and/or acoustically and/or put out through voice output via an output unit.

If an absolute-type flow rate sensor is used for the determination of the flow rate of the fluid, the electronic control unit may check or re-check, and, if necessary, correct stored control data after a predetermined number of dosing operations at a further dosing operation on the basis of the signal from the flow rate sensor, and update the stored amount information values accordingly.

The apparatus according to the present invention for carrying out the above-defined method comprises:

a fluid line comprising a fluid inlet and a fluid outlet, a shut-off device provided in the fluid line between the fluid inlet and the fluid outlet and allowing to switch the flow of a fluid from the fluid inlet flowing through the shut-off device on and off, an electronic control unit controlling the shut-off device, operation means connected to the control unit and delivering signals to the control unit upon operation by an operator, whereupon the control unit closes or opens the shut-off device, and input means connected to the control unit for putting in input information by an operator concerning the amount of fluid to be dosed, the apparatus being characterised in that the input means are memory input means delivering memory signals to the control unit, and the control unit is designed such that it, (A) upon one single manual dosing of a fluid amount by an operator by operating the operation means and/or the memory input means in a predetermined order in a learning mode initiated thereby, determines the amount of fluid discharged from the fluid outlet between the opening of the shut-off device effected via the operation means or the memory input means, respectively, and the subsequent closing of the shut-off device effected via the operation means and/or the memory input means as an amount information corresponding to that amount, and stores it as learned amount information in a memory allocated to the memory input means, the learning mode being terminated after the amount information has been stored, and (B) upon operation of the memory input means, optionally in combination with an operation of the operation means, changes over into a dosing mode, during which the learning mode is blocked and the memory is not overwritable, and opens the shut-off device and closes it in a controlled manner such that the amount of fluid discharged from the fluid outlet between the opening and the subsequent closing of the shut-off device corresponds to the amount information previously learned and stored in the memory in the learning mode, the dosing mode being terminated with the automatic closing of the shut-off device.

According to a preferred embodiment the memory input means comprise a memory command element and one or more storage location elements connected to the control unit, wherein the memory command element delivers upon operation a signal to the control unit which is used in the learning mode for generating a memory command and optionally for initiating the learning start and optionally for defining the learning end, and the storage location elements deliver signals upon operation in the learning mode to the control unit which are used for allocating an amount information learned or to be learned in the learning mode to the respective storage location element and/or for initiating the dosing start in the dosing mode.

According to a further preferred embodiment of the apparatus of the present invention the memory input means consist of storage allocation elements which, upon operation, deliver signals to the control unit which are used both for generating a memory command, and optionally for initiating the learning start, and for effecting an allocation of an amount information learned or to be learned in the learning mode to the respective storage location element, and optionally for defining the learning end and/or for initiating the dosing start in the dosing mode.

A preferred embodiment of the present apparatus is characterised in that the control unit is designed such that it (A) upon operation of the operation means and/or the memory input means turns into the learning mode and determines the amount of fluid discharged from the fluid outlet between the opening of the shut-off device effected via the operation means or the memory input means, respectively, and the subsequent closing of the shut-off device effected via the operation means and/or the memory input means as an amount information corresponding to that amount, and stores it as learned amount information in a memory allocated to the respective storage location element or the respective storage allocation element upon operation of a storage location element of the memory input means or of a storage allocation element of the memory input means, respectively, and (B) upon—optionally renewed—operation of the storage location element of the memory input means or the storage allocation element of the memory input means, optionally in combination with an operation of the operation means, changes over into the dosing mode and opens the shut-off device and closes it in a controlled manner such that the amount of fluid discharged from the fluid outlet between the opening and the subsequent closing of the shut-off device corresponds to the amount information previously learned and stored in the memory in the learning mode.

According to a preferred embodiment the shut-off device is a flow switch which can take only the fully open state or the fully closed state, particularly a solenoid valve.

A further preferred embodiment of the apparatus according to the present invention is characterised in that the shut-off device is a flow switch register consisting of two or more flow switches connected in parallel and/or of two or more independent flow switches, particularly solenoid valves, having a common fluid outlet and optionally also a common or partially common fluid inlet, wherein each of the flow switches of the flow switch register is capable of being controlled by the control unit.

This allows a quasi-continuous or stepwise opening and closing of the shut-off device. In addition thereto, by use of these flow switch registers various fluid sources may be connected or disconnected which is particularly advantageously for mixing procedures, e.g., for mixing different media or media of the same kind having different temperatures.

Alternatively, the shut-off device may be a control element which is adjustable in a continuous or stepwise manner between the fully open state and the fully closed state via an actuator drive controllable through the control unit using any kind of suitable valve, particularly a butterfly valve, a sliding valve, a control valve, etc..

Advantageously, the shut-off device may consist of at least two shut-off devices comprising actuator drives controlled by the control unit, each of the shut-off devices having its inlet connected to one of at least two fluid inlets for at least two different fluids, and having its outlet connected to the fluid outlet. This embodiment is suitable for mixing of two or more fluids. These mixing procedures may alternatively be executed also by means of any mixing device which is connected upstream of the shut-off device, for example, a three-way mixer, having its inlet connected to two fluid inlets and having its outlet connected to the fluid outlet.

According to a particularly preferred embodiment, between the shut-off device and the fluid outlet a safety shut-off device is provided, the safety shut-off device being a flow switch or a flow control element which is adjustable continuously or stepwise between the fully open state and the fully closed state through an actuator drive controllable by the control unit, particularly a solenoid valve. Advantageously, it is opened at the beginning of a dosing procedure in the learning mode and in the dosing mode at a time before the shut-off device opens and it is closed after the end of the dosing procedure at a time after the closing of the shut-off device.

In embodiments of the apparatus according to the present invention, wherein the amount information is generated through flow rate measurement in which the flow rate of fluid through the fluid line between the opening and the subsequent closing of the shut-off device is determined, a flow rate sensor is comprised preferably provided downstream of the shut-off device and connected to the control unit. In this case, the control unit is designed such that it—using the output signal of the flow rate sensor corresponding to the instantaneous flow rate of the fluid—controls the shut-off device such that the instantaneous flow rate corresponds exactly or approximately to the desired flow rate.

Commercial flow meters like the above-mentioned are usually designed such that they allow the determination of the mass flow or the mass flow rate ($\dot{M}$) (mass/time) or the fluid flow or fluid flow rate ($\dot{V}$) (volume/time) as well as the corresponding absolute fluid mass or absolute fluid volume integrated over the time. In dependence of the type of the flow meter used or the output signal thereof, the control unit—in particular with regard to the corresponding software—is designed such that the control unit itself carries out either the absolute mass and absolute volume determination, respectively, or that these data have already been transmitted thereto from the flow rate sensor.

Correspondingly, the flow rate sensors mentioned above regarding the state of the art are known to those skilled in the art. Apart from mechanical flow meters, preferably suitable flow meters for the purposes of the present invention are magneto-inductive flow meters, vortex flow meters based on the Karman principle, ultrasonic flow meters and mass flow meters based on the Coriolis principle.

A dosing system according to the invention wherein the flow rate is detected, is preferably provided in the form of a closed loop control, in particular, if the flow rate signal is a fluid flow signal ($\dot{V}$), $\dot{M}$) with the control unit evaluating the signal of the flow rate sensor, if necessary, by integration of the fluid flow over time, and closing the shut-off device, if the fluid amount discharged from the fluid outlet corresponds to the desired fluid amount (mass, volume) which has been stored as amount information in a memory and which is requestable by operating the memory input means and reproducibly dosed.

The control unit according to the invention may be any electronic unit which receives input information, processes the same and drives corresponding actuators, including in particular the shut-off device.

The control unit is preferred a per se known microcomputer system or microprocessor system comprising a central processing unit (CPU), a read-only memory (ROM), a random-access memory (RAM) and an interface (I/O unit) which are advantageously interconnected via one or several bus systems, which may be also used for the data transfer with external devices and units.

Those microprocessor systems including their user-specific structure, the user-specific software, and the external devices, are per se known to those skilled in the art and are standard systems, so that any detailed explanation thereof is not necessary.

The operating system, the existing programs and subprograms which have possibly been stored in the ROM, are realised by those skilled in the art in a manner known per se such that the above-defined system functions are obtained with allocation to predetermined operation functions or operation sequences.

Within the scope of the present invention, a very great number of combinations in respect of the input information, the input order of the input information and the input duration of the input information at the beginning and the end of the learning mode is possible for obtaining a learning mode with learning and storing of fluid amounts and for obtaining a dosing mode for the reproduction of stored fluid amounts. Those skilled in the art may work out the corresponding software and program and configure the system correspondingly for each combination of input information or input key operations and any desired sequence of operations and functions in both operation modes, without involving inventive activity.

Correspondingly, the method and apparatus of the invention may be realised in a great number of embodiments which are different regarding the input information and the function, which, nevertheless, have always in common the same basic concept, namely that a learning dosing system is concerned which is able to learn the fluid amount dosed in one single manual "predosing" procedure, and to reproduce it in a dosing mode in a repeatable manner.

According to a preferred embodiment, the microprocessor-controlled apparatus contains in the read-only memory (ROM) and/or in the read-write memory (RAM) at least one map, wherein control values for controlling the shut-off device and optionally the safety shut-off device allocated to the temperature and/or to the flow rate and/or to the time are stored, for correcting measuring values and control values, if necessary. The map structure has the advantage that calculation results or external data, e.g., empirically obtained data, may be stored therein in dependence of one or several parameters to reduce calculation and processing time and to allow a quick response of the control system. Map control systems are known per se to those skilled in the art.

For many uses it is advantageous, e.g., for hygienical or working environmental reasons, for a greater handling ease for handicapped people or for the prevention of vandalism, to design the operation means as means known per se for contact-less, presence-depending control or proximity control, respectively, which are based on the principle of light barrier using visible light or infrared light, passive infrared detection, ultrasound detection, the radar principle or the application of microwaves, and are controlled by the control unit.

A preferred embodiment of the apparatus comprises an output unit which is controlled by the control unit and is designed as optical display and/or as acoustic output means, particularly voice output means, and/or as printer. It may also implement an interface or bus function, which allows an integration of the apparatus in units or plants, for example, in the field of mechanical and chemical engineering, in a particularly simple manner, wherein dosing procedures have to be executed for example in conduit systems under a hierarchical or decentralised control.

According to a further advantageous embodiment the operation means and/or the memory input means are adapted through the control unit for performing interactive operation with a user and are preferably voice-controlled. An apparatus which may advantageously be used specifically in the field of equipment for handicapped people is characterised in that the output means are designed as voice-controlled means and further comprise a microphone for voice or sound detection or recording, and the control unit is designed such that it evaluates the signals from the microphone for voice or sound recognition and, upon reception of specific or predetermined voice or sound signals, controls the operation means and/or the memory input means in a learning mode or in a dosing mode.

Particularly preferred are apparatuses according to the invention having a temperature input element for the input of desired temperature values which is connected to the control unit, and wherein the control unit controls the actuator drives of mixing means the inlets of which are connected to fluid sources for fluids of different temperatures, in an open loop or closed-loop control such that a mixed fluid of the set temperature results at the fluid outlet, since the mixing temperature represents the mixing criterion most frequently used in practice.

The concept of the invention comprises as a preferred embodiment that the control unit is designed such that the shut-off device can be manually opened and closed again (ON/OFF function) via the operation means as a conventional flow switch, particularly a water tap or a conventional flow control element, without operation of a storage location element or of a storage allocation element of the memory input means. Thus, apart from the learning function, the apparatus according to the invention may also have the function of a common water tap, a mixer battery and comparable devices.

BRIEF DESCRIPTION OF THE DRAWINGS

In the following, the invention will be described by means of examples with reference to the accompanying drawings. However, the feature combinations embodied in the illustrated devices are not to be understood as being limitations.

In the drawings show:

FIGS. 1 and 3 to 7: apparatuses according to the present invention;

FIGS. 1a(a), 2(b): flow switch registers which may be used according to the invention;

DETAILED DESCRIPTION OF THE PREFERRED EMBODIMENTS

The concept of the present invention is generally suitable for dosing all kinds of fluids, i.e., generally for gases and liquids including, apart from pure liquids, also corresponding solutions, in particular water or aqueous solutions and in particular tap water, non-aqueous solvents or solutions, dispersions and emulsions. To the gases which may be dosed in accordance with the present invention belong also aerosols, the dispersed component of which may be liquid or solid. As fluids in particular drinking water or service water are concerned which, if bath tub filling, shower, wash-bowl or sink unit batteries are concerned, can preferably be supplied into the shut-off device with a selectable temperature. For these purposes the pretempered water is in particular introduced from a thermostatically controlled reservoir or a mixer unit.

For simplification and with regard to the fact that the present invention is applicable in particular in the field of sanitary batteries, reference is made to water as a typical example for a fluid.

Figure 1:
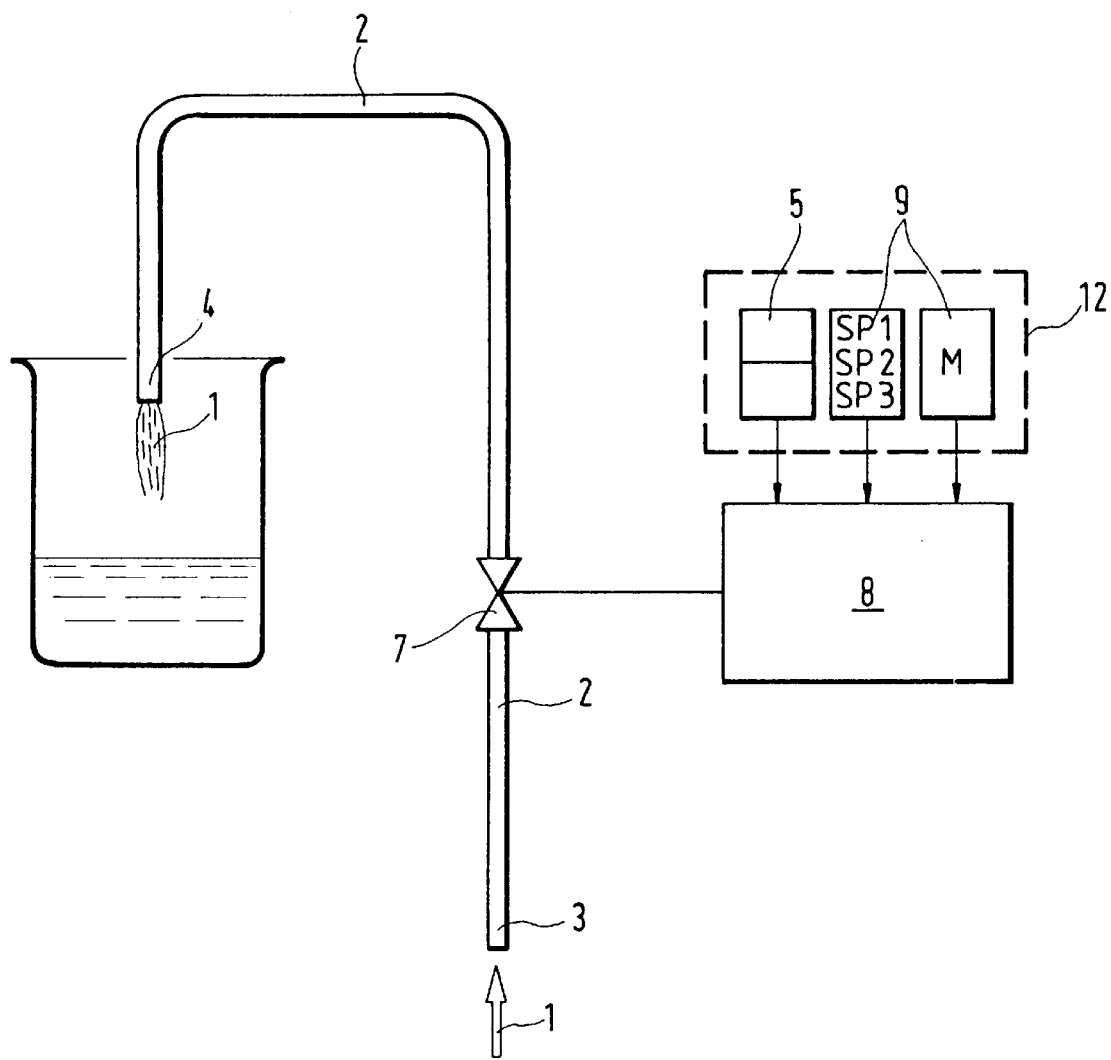
FIG. 1 is the simplest embodiment of the invention.

The apparatus shown in FIG. 1 is the simplest embodiment of the invention. It comprises a tube system with a fluid line 2 having a fluid inlet 3 for a fluid and a fluid outlet 4 from which the fluid 1 is discharged. Preferably, the source for the fluid 1 is a water conduit.

The apparatus of FIG. 1 further comprises a shut-off device 7 provided downstream of the fluid inlet 3, and an electronic control unit 8 connected to operation means 5 as well as to memory input means 9. The shut-off device is a controllable shut-off device (7) provided in the fluid line (2) between the fluid inlet (3) and the fluid outlet (4) allowing to switch the flow of a fluid (1) on and off.

The shut-off device, particularly preferred a solenoid valve, is controlled by the electronic control unit 8.

In the simplest case, the operation means 5 consist of two keys (ON and OFF), by pressing of which the shut-off device 7 may be operated via the control and detection unit 8 (referred to hereafter as merely the control unit 8).

If only the operation means 5 are operated, via which the driving of the shut-off device 7 is effected, the apparatus only works as an electromechanical flow switch and, thus, has only the function of a simple water tap. When the ON key of the operation means 5 is pressed, the shut-off device 7 is opened via the control unit 8 and closed again if the OFF-key is pressed. The two functions ON and OFF of the operation means 5 may advantageously be allocated to one single operator element, e.g., a key, with the ON function resulting from a first actuation and the OFF function resulting from the subsequent actuation thereof.

The memory input means 9 comprises a memory command element M and at least one storage location element SP and preferably several storage location elements SP1, SP2, SP3, . . . .

Also these operation elements preferably consist of keys (M, SP1, SP2, SP3, . . . ); they are connected to the electronic control unit 8.

The memory command element M serves to cause the control unit 8 to store an amount information learned or to be learned in the learning mode and, if necessary, to also initiate the learning mode. In the learning mode the storage location elements serve to allocate an amount information learned or to be learned to a certain storage location or storage area and in the dosing mode to initiate the readout of the correspondingly stored amount information in the electronic control unit 8 which is used for a corresponding control of the opening and closing of the shut-off device 7.

The operation elements 5 and 9 are preferably arranged in an operating board 12 which may be provided separately from the electronic control unit 8 and arranged at an operator-friendly position on the corresponding tap or battery or in the vicinity thereof. The control unit 8 is preferably arranged close to the tap such that it is not in the visible area, preferably, for example, under a wash-bowl or a sink unit or buried in a wall. The control unit needs a usual power supply, e.g., through a connection to the normal power line, and is connected via a data connection to the operation elements, e.g., the operating board 12 and the actuator elements, in particular the shut-off device 7. The different kinds of those data connections are per se known to those skilled in the art. Particularly preferred is a wireless data transfer between the operation elements 5 and 9 of the operating board 12 and the control unit 8 through radio connection. In addition, the control unit 8 is preferably combined with the hydraulic system consisting of the fluid line 2 with fluid inlet 3 and fluid outlet 4, and the shut-off device 7 as well as further external component parts, sensors, flow controllers, fluid filters, etc., in the form of a modular design.

By means of the single manual "predosing" in the learning mode the control unit 8 receives an amount information allocated to the predosed fluid amount. In allocation to a storage location element SP (SP1, SP2, SP3, . . . ) or a storage allocation element MSP (MSP1, MSP2, MSP3, . . . ), respectively, it is requestably stored and is rewritable in a new learning mode.

In the simplest embodiment this amount information is a time information (open time of the shut-off device 7), since in this dosing system the open time of the shut-off device 7 is approximately proportional to the amount of fluid flown through the line, if the flow rate is sufficiently constant in the learning and the dosage modes, i.e., in the case the fluid flow rate is being kept constant by a flow controller.

However, the amount information may be any other information, for example, coming from a flow rate measuring device, a pressure sensor, a level sensor, and the like.

Common liquid flow rates in sanitary batteries are in the range of about 1 to about 22 l/min and preferably in the range of about 2 to about 14 l/min.

Common flow controllers which are preferably arranged downstream of the shut-off device 7 maintain the flow rate (volume/time, $\dot{V}$) constant with an accuracy of about ±5% within a pressure range of about 1 to 10 bar input pressure. Thus, they allow to detect the open time of the shut-off device 7 as an amount information in a particularly preferred manner.

The following is a typical operation sequence of a learning procedure in the learning mode and a dosing procedure in the dosing mode:

1. Initially, the memory command element M is actuated. Thereby the control unit 8 is set into the learning mode, and the detection and learning of an amount information (e.g. the open time of the shut-off device 7) is initiated (learning start, in the following also abbreviated as $L_B$).
2. The operation means 5 are actuated, whereupon the control unit 8 opens the shut-off device 7 (ON) and detects the amount information during the open time of the shut-off device 7.
3. The renewed actuation of the operation means 5 causes the control unit 8 to close the shut-off device 7 (OFF). Thus, the amount information has been provided.
4. By actuating a storage location element SP (SP1, SP2, SP3, . . . ) the amount information is stored with allocation to the actuated storage location element SP (SP1, SP2, SP3, . . . ) and thus, the learning mode is terminated (learning end, in the following also abbreviated as $L_E$).

The fluid amount learned in this way may be reproduced in a dosing mode at any time, for example by the following alternative operation procedures:

Simply actuating the storage location element SP (SP1, SP2, SP3, . . . ) allocated to the desired learned fluid amount. Thereupon the control unit 8 opens the shut-off device 7 and automatically closes it when the amount of liquid corresponding to the amount information stored has flown therethrough. This dosage manner is particularly advantageously, since an operator has to carry out only one single input operation.

Alternatively, the storage location element SP (SP1, SP2, SP3, . . . ) may be actuated at first, whereby the dosing mode is initiated for the control unit 8, i.e., with allocation to the corresponding desired learned amount of liquid. Then follows the opening of the shut-off device 7 by a subsequent actuation of the operation means 5. The closing of the shut-off device in turn is carried out automatically after the amount of liquid corresponding to the stored amount information has flown therethrough.

Thus, the apparatus according to the invention which represents a learning dosing system, stores the corresponding amount predosed by an operator in a suitable, requestable form, without the necessity that a respective numerical information (volume, mass, time, etc.) be input by an operator or on the side of the apparatus.

Consequently, it is not necessary that the operator knows the volume or the mass of liquid which has been stored in the learning mode and which is again reproducible in the dosing mode, because there is no need to input this information. The learning mode or the learning start may be initiated not only by actuating the memory input means 9, i.e., the memory command element M or a storage location element SP (SP1, SP', SP3, . . . ), but also by actuating the operation means 5 (ON).

Thereby and by various possible actuation orders (sequences) for these operation elements (5, M, SP) at the learning start and at the learning end numerous functional combinations of actuations within the scope of the present invention are resulting which are realisable by a corresponding software design of the control unit 8, and, if necessary, an "intelligent" operating board 12.

A great part of these possible combinations is indicated in Table 1. This list contains particularly typical combinations of actuations, and therefore, it is not an exhaustive listing. Table 1 represents a digital function table in which "0" means no actuation, and "1" means actuation of the corresponding operation element.

TABLE 1

| Operation(s) | | | | | |
|---|---|---|---|---|---|
| at learning start | | | at learning end | | |
| (5) | (M) | (SP) | (5) | (M) | (SP) |
| 0 | 1 | 0 | 0 | 0 | 1 |
| 0 | 1 | 0 | 1 | 0 | 1 |
| 0 | 0 | 1 | 0 | 1 | 0 |
| 0 | 0 | 1 | 0 | 1 | 1 |
| 0 | 0 | 1 | 1 | 1 | 0 |
| 0 | 0 | 1 | 1 | 1 | 1 |
| 0 | 1 | 1 | 1 | 0 | 0 |
| 1 | 1 | 0 | 0 | 0 | 1 |
| 1 | 1 | 0 | 1 | 0 | 1 |
| 1 | 0 | 1 | 0 | 1 | 0 |
| 1 | 0 | 1 | 1 | 1 | 0 |
| 1 | 1 | 1 | 1 | 0 | 0 |
| 1 | 0 | 0 | 0 | 1 | 1 |
| 1 | 0 | 0 | 1 | 1 | 1 |

Since Table 1 is a function table, two "1" or three "1" in one line at the learning start and/or at the learning end do not include any sequence information. Thus, for example, the combination "1 1 0" in line 8 of Table 1 (learning start) includes the two operation sequences (5)→(M)

and (M)→(5), and the combination "1 1 1" of line 12 (learning start) includes the operation sequences (5)→(M)→(SP)

(5)→(SP)→(M)

(M)→(5)→(P)

(M)→(SP)→(5)

(SP)→(M)→(5)

(SP)→(5)→(M).

The arrows indicate the direction of the sequence:

"(5)→(M)" correspondingly means: actuation of (5) at first, then actuation of (M).

Table 2 shows the operation sequences resulting from Table 1. Correspondingly, neither Table 2 does represent an exhaustive listing of the possible operation sequences.

TABLE 2

| | User Operation(s) | |
|---|---|---|
| | at learning start | at learning end |
| 1 | (M)* $L_B$ ON | (SP)* $L_E$ OFF |
| 2 | (M)* $L_B$ ON | (5) → (SP) OFF $L_E$ |
| 3 | (M)* $L_B$ ON | (SP) → (5) $L_E$ OFF |
| 4 | (SP)*long $L_B$ ON | (M)* $L_E$ OFF |
| 5 | (SP)*long $L_B$ ON | (M) → (SP) $L_E$ OFF |
| 6 | (SP)*hold $L_B$ ON | (SP) → (M)* rel. $L_E$ OFF |
| 7 | (SP)*long $L_B$ ON | (5) → (M) OFF $L_E$ |
| 8 | (SP)*long $L_B$ ON | (5) → (M) $L_E$ OFF |
| 9 | (SP)*long $L_B$ ON | (M)→(5)→(SP) |
| 10 | (SP)*long $L_B$ ON | (M)→(SP)→(5) $L_E$ OFF |
| 11 | (SP)*long $L_B$ ON | (5)→(M)→(SP) OFF $L_E$ |
| 12 | (SP)*long $L_B$ ON | (5)→(SP)→(M) OFF $L_E$ |
| 13 | (SP)*hold $L_B$ ON | (SP)→(M)→(5) rel. $L_E$ OFF |
| 14 | (SP)*hold $L_B$ ON | (SP)→(5)→(M) rel. OFF $L_E$ |
| 15 | (M) → (SP)* $L_B$ ON | (5)* $L_E$ OFF |
| 16 | (SP) → (M)* $L_B$ ON | (5)* $L_E$ OFF |
| 17 | (5) → (M) $L_B$ ON | (SP)* $L_E$ OFF |
| 18 | (M) → (5) $L_B$ ON | (SP)* $L_E$ OFF |
| 19 | (5) → (M) $L_B$ ON | (5)→(SP) OFF $L_E$ |
| 20 | (5) → (M) $L_B$ ON | (SP)→(5) $L_E$ OFF |
| 21 | (M) → (5) $L_B$ ON | (5)→(SP) OFF $L_E$ |
| 22 | (M) → (5) $L_B$ ON | (SP)→(5) $L_E$ OFF |
| 23 | (5) → (SP) $L_B$ ON | (M)* $L_E$ OFF |
| 24 | (SP) → (5) $L_B$ ON | (M)* $L_E$ OFF |
| 25 | (5) → (SP) $L_B$ ON | (5)→(M) OFF $L_E$ |
| 26 | (5) → (SP) $L_B$ ON | (M)→(5) $L_E$ OFF |
| 27 | (SP) → (SP) $L_B$ ON | (5)→(M) OFF $L_E$ |
| 28 | (SP) → (5) $L_B$ ON | (M) → (5) $L_E$ OFF |
| 29 | (M)→(SP)→(5) $L_B$ ON | (5)* $L_E$ OFF |
| 30 | (5)→(SP)→(M) $L_B$ ON | (5)* $L_E$ OFF |
| 31 | (5)→(M)→(SP) $L_B$ ON | (5)* $L_E$ OFF |
| 32 | (SP)→(M)→(5) $L_B$ ON | (5)* $L_E$ OFF |
| 33 | (5)* $L_B$ ON | (M)*→(SP) OFF $L_E$ |
| 34 | (5)* $L_B$ ON | (SP)→(M)* $L_E$ OFF |
| 35 | (5)* $L_B$ ON | (5)→(M)→(SP) OFF $L_E$ |
| 36 | (5)* $L_B$ ON | (5)→(SP)→(M) OFF $L_E$ |
| 37 | (5)* $L_B$ ON | (M)→(5)→(SP) OFF $L_E$ |
| 38 | (5)* $L_B$ ON | (M)→(SP)→(5) $L_E$ OFF |
| 39 | (5)* $L_B$ ON | (SP)→(M)→(5) $L_E$ OFF |
| 40 | (5)* $L_B$ ON | (SP)→(5)→(M) OFF $L_E$ |

In Table 2 (and the following explanations) the following meanings apply:

| | |
|---|---|
| LB | Start of the learning mode |
| LE | End of the learning mode |
| ON | Opening of the shut-off device (7) |
| OFF | Closing of the shut-off device (7) |
| → | Sequence of the user operations and |
| * | Double function of the respective input element, i.e. the function directly related to it (first function) as well as another function (second function) |

The typical combinations of operations listed in Table 2 are immediately understandable as they are sequences of the specified user operations.

For further explanation, several examples for actuation sequences contained in Table 2 and the respective functions will be given below.

Example according to Table 2, line 19:

Start of learning ($L_S$):

By operating (5) the shut-off device 7 is opened (ON). The control unit 8 is so designed that on operation of (5) the quantity information is detected and buffered. The subsequent operation of (M) confirms storage or causes final storage.

End of learning ($L_E$):

The operation of (5) causes the control unit 8 to shut the shut-off device 7 (OFF). The operation of (SP) results in the storage of the present quantity information according to the allocation to the selected storage location element (SP) (e.g. SP2).

Example according to Table 2, line 20:

Start of learning ($L_S$):

Here, the same applies as in the example according to Table 2, line 19.

End of learning ($L_E$):

The operation of (SP) causes the control unit 8 to allocate the quantity information (which is not yet available at that time) to a certain selected storage location element (SP) (e.g. SP2). The subsequent operation of (5) causes the control unit 8 to close the shut-off device 7 (OFF). Thus, the quantity information to be stored is present. After the storage of the quantity information the learning mode is terminated.

Example according to Table 2, line 21:

Start of learning ($L_S$):

The operation of (M) signals to the control unit 8 that the quantity of the fluid that has passed between the opening (ON) caused thereafter and the subsequent closing of the shut-off device 7 (OFF) is to be stored as quantity information.

The operation of (5) causes the opening of the shut-off device 7 (ON).

End of learning ($L_E$):

Due to the operation of (5), the shut-off device 7 is closed (OFF). The operation of (SP) leads to the storage of the present quantity information according to the allocation to a selected storage location element (SP) (e.g. SP2).

This operation sequence and with it the related functional design of the apparatus and especially the software-related design of the control unit 8 is particularly advantageous according to the invention, as will be further explained with reference to FIGS. 13 and 14.

Example according to Table 2, line 22:

Start of learning ($L_S$):

Here, the same applies as in the example according to Table 2, line 21.

End of learning ($L_E$):

Here, the same applies as in the example according to Table 2, line 21.

This variant, too, is advantageous according to the invention.

Example according to Table 2, line 25:

Start of learning ($L_S$):

By operation of (5) the shut-off device 7 is opened (ON), and the learning mode is started. By a subsequent operation of (SP) the quantity information to be learned is allocated to one of the storage location elements (SP) (e.g. SP2).

End of learning ($L_E$):

By operating (5) the shut off-device 7 is closed (OFF). By the subsequent operation of the memory command element (M) the quantity information allocated to the selected storage location element (SP) (e.g. SP2) is stored, and the learning mode is terminated.

Example according to Table 2, line 26:

Start of learning ($L_S$):

Here, the same applies as in the previous example according to Table 2, line 25.

End of learning ($L_E$):

The operation of (M) signalises to the control unit 8 that the quantity information (which is not yet available at that time) is to be stored according to the allocation to the selected (SP) (e.g. SP2).

The subsequent operation of (5) causes the closure of the shut-off device 7 (OFF), the storage of the quantity information in accordance with the allocation to the selected (SP) (e.g. SP2), and the termination of the learning mode.

Example according to Table 2, line 27:

Start of learning ($L_S$):

The operation of (SP) initialises the learning mode and causes the control unit 8 to allocate the quantity information to be learned to the selected (SP) (e.g. SP2). The subsequent operation of (5) leads to opening of the shut-off device 7 (ON).

End of learning ($L_E$):

The operation of (5) causes a closing of the shut-off device (OFF). Thus, the quantity information is present, which is then stored in accordance with the allocation to the selected (SP) (e.g. SP2) due to the subsequent operation of (M). After storage has been effected, the learning mode is terminated.

Example according to Table 2, line 28:

Start of learning ($L_S$):

In this case, the same applies as in the previous example according to line 27.

End of learning ($L_E$):

In this case, the same applies as in the previous example according to line 26.

As shown in Table 2, the symbol "*" only appears when at the start of learning or at the end of learning just a single user operation is required or when (5) is not included.

Thus, as at the start of the learning process the detection and storage of the quantity information are initialised and the shut-off device 7 needs to be opened, and as at the end of the learning process the detected quantity information is to be stored and the shut-off device 7 has to be closed again, with such a design of the system according to the invention, these two functions must be triggered by the single user operation to be performed.

Example according to Table 2, line 1:

Start of learning ($L_S$):

Exclusive operation of (M): The system enters the learning mode (start of learning $L_B$) (directly allocated first function), and the shut-off device 7 is opened (ON) (second function).

End of learning ($L_E$):

Exclusive operation of (SP): The shut-off device 7 is closed (OFF) (second function), and the quantity information is stored (first function), the learning mode being terminated at the same time.

Example according to Table 2, line 33:

Start of learning ($L_S$):

Exclusive operation of the operation means (5). The control unit 8 is so designed in this case that with every operation of the operation means (5) leading to an opening of the shut-off device 7 (first function), a detection and buffering of the quantity information is effected as well (second function).

End of learning ($L_E$):

Due to the operation of (M), the shut-off device is closed (second function). Further, the storage of the present quantity information is initialised (first function), which is effected in accordance with the allocation to the selected storage location element (SP1, SP2, SP3, . . . ) on operation of the storage location element (SP). The termination of the learning process, $L_E$, accordingly follows the operation of (SP).

The other single operations in Table 2 provided with an asterisk "*" are to be understood in an analogue way.

Where no additional specifications are given, the operations "(5)", "(M)", and "(SP)" mean a short operation of the operation means, e.g. a short pressing of the allocated key.

In certain combinations, particularly in "*" functions, i.e. in double or multiple functions of the respective operation means, it may be advantageous to provide for a longer operation exceeding the duration of a short operation for a given time (e.g. for one second or more), a continuous holding for a given period and a subsequent release, or a multiple operation (e.g. pressing the related key twice). In this way, with the respective input element, not only the directly allocated function, but also the second function (and, if necessary, other functions) is (are) triggered by the additional information due to longer operation, holding, or multiple operation.

An example for this is shown in Table 2, line 4:

Start of learning ($L_S$):

A short operation of the key (SP) initialises the dosing mode and the start of the dosing of the amount of fluid stored by opening the shut-off device 7 as well as to an automatic closure after dosing the selected stored amount.

A longer operation (or a holding or a multiple operation) of (SP), however, initialises the learning mode, comprising the allocation of the quantity information to be stored to a certain storage location element (SP) (SP1, SP2, SP3, . . . ) (first function) and leads to the shut-off device 7 being opened (ON) (second function).

End of learning ($L_E$):

An operation of the memory command element (M) causes the shut-off device 7 to be closed (second function) and the quantity information to be stored (first function).

Another example for the use of the time parameter as an additional information is shown in Table 2, line 6:

In this case, the control unit is so designed that, at the beginning of the learning process, holding the storage location element (SP) causes initialisation of the learning mode including the allocation of the storage location (first function) and the opening of the shut-off device 7 (ON) (second function), which will remain open until the operation of the storage location element (SP) is terminated, for example, when a key (SP) is released. The operation of (M) (* double function) then causes the shut-off device 7 to be closed (first function) and the quantity information being stored (second function). The dosing mode may also be initialised by a longer operation or holding of the operation means 5. In addition to the above two alternatives for the initialisation of the dosing mode, there is, for example, a third possibility in the form of following operation sequence:

(5)→(SP)

long

While a short operation of (5) results in the normal "water tap" function of the apparatus, at a longer operation or a continuous pressing of (5), the control unit 8 realises that the dosing mode is to be initialised. In case of a subsequent operation of (SP) (SP1, SP2, SP3, . . . ) the shut-off device 7 is opened; and it is automatically closed after the amount of fluid allocated to (SP) has flown out.

Due to the above explanation, anyone skilled in the art will doubtlessly be able to design the control unit 8 or the related software so that the steps of the process or functions of the apparatus related to the specified user operations are realised.

According to an advantageous embodiment of the invention, the flow rate of the fluid (volume/time, $\dot{V}$; mass/time, $\dot{M}$) may be selected within a given range. This additional function is equal to opening a water tap or a single-lever outlet tap more or less to gain a stronger or weaker flow.

FIGS. 2(a) and (b) show two advantageous embodiments of the shut-off device 7 using magnetic valves which are very favourable due to their simple electrical controlability and operation safety. The arrangement of FIG. 2(a) shows a flow switch register of three shut-off devices 7', 7" 7'" which are connected in parallel and can be independently controlled by the control unit. These shut-off devices are magnetic valves.

The magnetic valves 7', 7" 7'" have a common fluid line 2 at the inlet side which is connected to a common fluid inlet 3 into which the fluid 1 is introduced. The individual magnetic valves open into a common fluid outlet 4. Such flow switch registers as such are known to those skilled in the art. Due to the individual control of the three magnetic valves, the combinations shown in Table 3 below arise if the individual magnetic valves are operated without temporal offset.

TABLE 3

| STATE | 7' | 7" | 7'" |
|---|---|---|---|
| OFF | 0 | 0 | 0 |
| ON | 1 | 0 | 0 |
|  | 0 | 1 | 0 |
|  | 0 | 0 | 1 |
|  | 1 | 1 | 0 |
|  | 1 | 0 | 1 |
|  | 0 | 1 | 1 |
|  | 1 | 1 | 1 |

It is particularly advantageous if the magnetic valves have 7', 7" 7'" different flow diameters and thus different flow rates in an open state to enable full utilisation of the combinations listed in the above function table for obtaining graduated flow rates. Flow controllers 13 are connected downstream of the individual magnetic valves 7', 7" 7'", which flow controllers 13 keep the flow rates in the respective outlet lines constant, whereby the accuracy of the reproduction of the different total flow rates of the shut-off device 7 is increased.

In the lower part of FIG. 2(a), according to a facultative measure, two additional magnetic valves 7*, 7** are shown which have a fluid inlet 3' or 3" for a fluid 1' or 1" at the inlet side and are, at the outlet side, connected to a common fluid outlet which may constitute the fluid inlet 3 of the arrangement described above for the fluid 1. The magnetic valves 7*, 7** are also controlled by the control unit 8.

The overall arrangement of FIG. 2(a) therefore is a parallel-serial connection of magnetic valves.

The fluids 1', 1" may be two different kinds of fluids or identical fluids with a different property, particularly two fluids of different temperatures (e.g. fluid 1': cold; fluid 1": hot).

By correspondingly driving the magnetic valves 7*, 7** a simple mixer function may be obtained, the resulting mixed fluid 1 (which may, in the arrangement shown, be either cold or warm or hot) being introduced into the shut-off device 7. Particularly in case of a constant supply of the fluids 1', 1" (with constant pressure, constant flow rate, constant temperature), this arrangement is advantageous due to its simple construction and simple operation.

Of course more such arrangements of magnetic valves 7*, 7** may be provided, also in the arrangement of FIG. 2(b) described below.

The flow switch register shown in FIG. 2(b) corresponds to the one shown in FIG. 2(a) with the exception that two of the magnetic valves (7', 7") are connected to a common fluid line 2' and therefore a common fluid inlet 3' for a fluid 1' at the inlet side while the third magnetic valve 7''' is connected to an independent fluid inlet 3'' for a second fluid 1'' via a fluid line 2''.

Flow switch registers of this type, which may have a larger number of magnetic valves then shown, are adapted for a controlled switching and simultaneous mixing of two fluids 1', 1'' which may, for example, be one and the same fluid with different temperatures. Due to this arrangement, the apparatus of the invention may not only switch to different flow rates but simultaneously provide a mixer function.

The shut-off device 7 can also be combined with a flow controller or flow regulation means to realise selectable flow rates. Such devices may be provided at the upstream or at the downstream side of the shut-off device 7. Preferably, piston-controlled means will be used for this purpose.

The memory input means 9 shown in FIG. 1 consists of a memory command element M and one or preferably more storage location elements SP (SP1, SP2, SP3, . . . ).

Within the scope of the conception of the invention the two input functions "(M)" (memory command) and "(SP)" (storage location allocation/storage location control) of the memory input means 9 may be summarised in a consolidated function, whereby a simplification of the apparatus as well as of the operation is obtained.

The scheme shown below explains these two alternatives, Alternative 1 being realised in the apparatus according to FIG. 1.

| | Memory input means 9: | |
|---|---|---|
| [M] | Alternative1<br>[SP1], [SP2], [SP3], etc. | Alternative2<br>[MSP1], [MSP2], [MSP3], etc. |
| Memory<br>Command<br>Element<br>(M) | Storage<br>Location<br>Elements<br>(SP) | Storage<br>Allocation<br>Elements<br>(MSP) |

The storage allocation elements (MSP) each have the function of the memory command element (M) and of one storage location element (SP) at the same time. In case of Alternative 2, only one operation element (input key) is to be operated, respectively.

Figure 2:
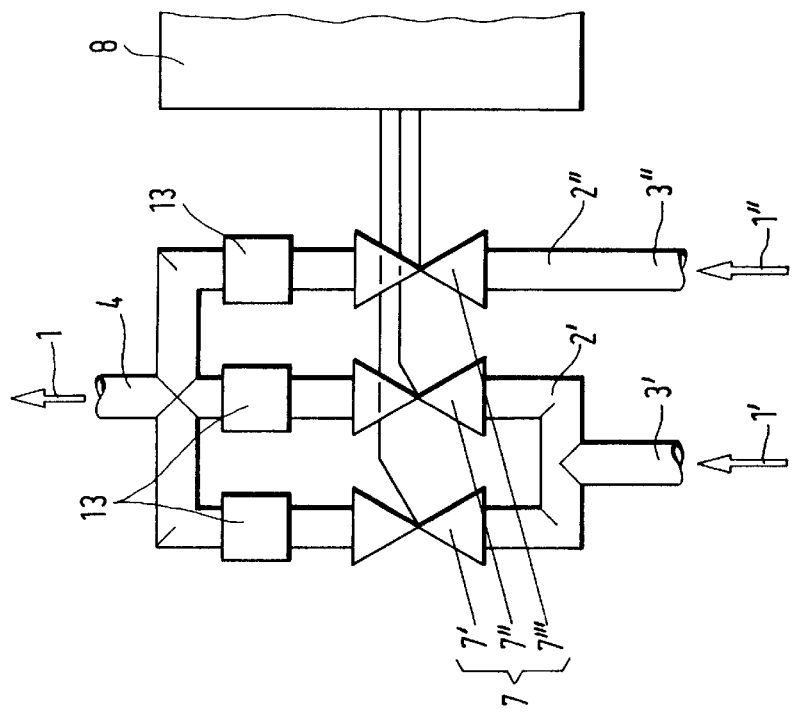
Figure 2:
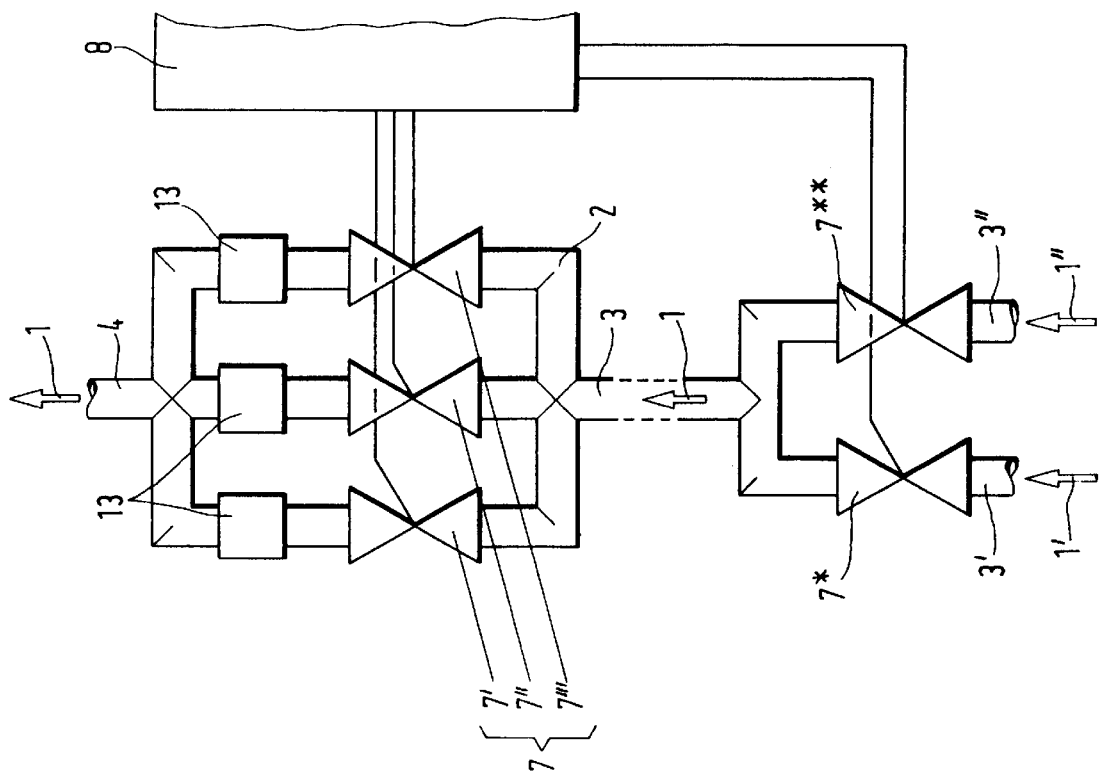
Figure 3:
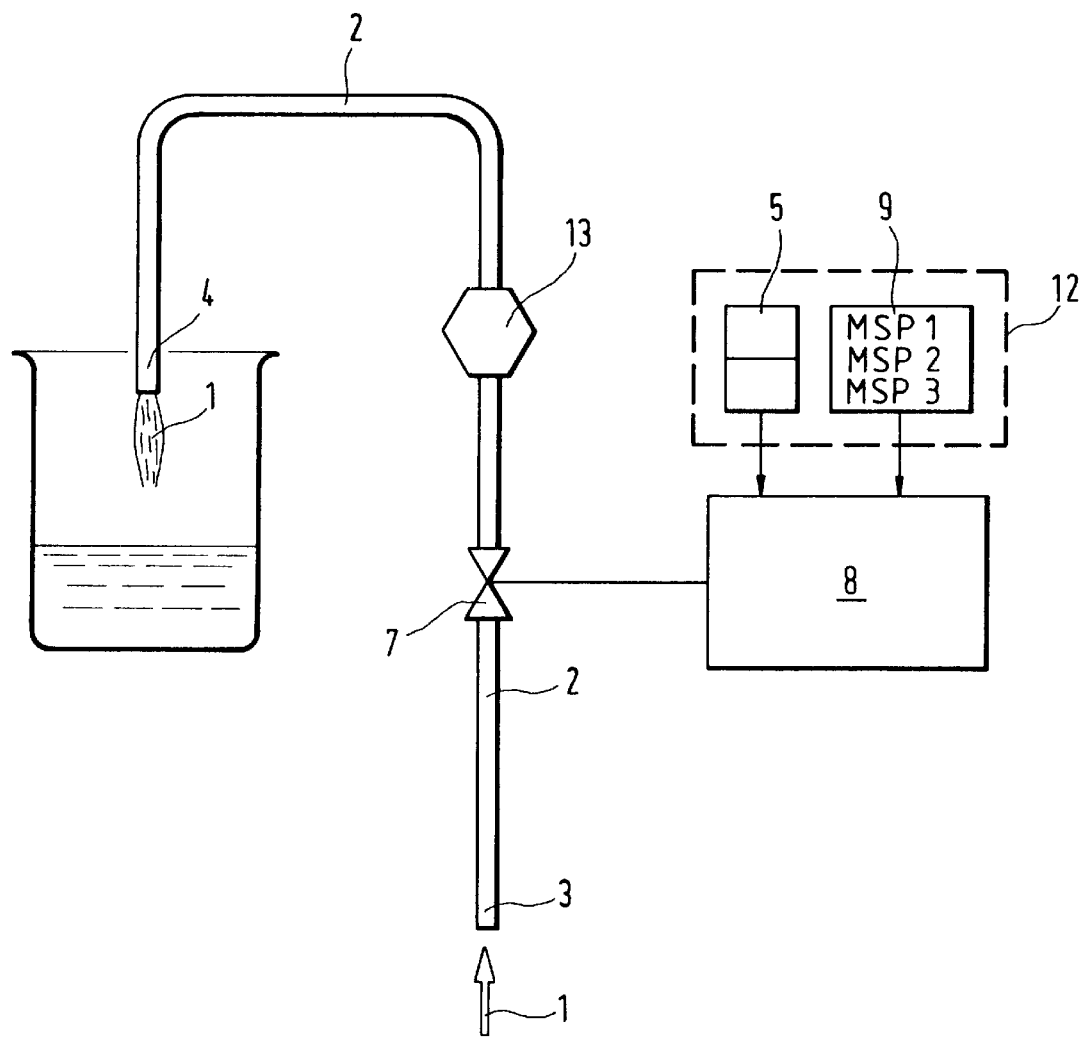

An apparatus according to the invention corresponding to Alternative 2 is shown in FIG. 3. The same numerals specify the same elements as in FIGS. 1 and 2. In the fluid line 2 a flow controller 13 is provided downstream of the shut-off device 7, the flow controller 13 keeping the flow rate of the fluid constant when the shut-off device 7 is opened.

Due to the consolidation of the two functions "(M)" and "(SP)" the typical functional combinations of operations of the operation means 5 and the memory input means 9 (MSP) shown in Table 4 below are obtained for the learning mode in case of Alternative 2 of FIG. 3.

TABLE 4

| Operation(s) | | | |
|---|---|---|---|
| at learning start | | at learning end | |
| (5) | (MSP) | (5) | (MSP) |
| 1 | 0 | 0 | 1 |
| 1 | 0 | 1 | 1 |

TABLE 4-continued

| Operation(s) | | | |
|---|---|---|---|
| at learning start | | at learning end | |
| (5) | (MSP) | (5) | (MSP) |
| 0 | 1 | 0 | 1 |
| 0 | 1 | 1 | 0 |
| 0 | 1 | 1 | 1 |
| 1 | 1 | 0 | 1 |
| 1 | 1 | 1 | 0 |
| 1 | 1 | 1 | 1 |

As in the case of Table 1, in Table 4 the lines in which "1" is contained two times do not contain any sequence information.

In Table 5, the operation sequences resulting from Table 4 are shown. This list as well is not comprehensive.

TABLE 5

| | User Operation(s) | |
|---|---|---|
| | at learning start | at learning end |
| 1 | (5)*<br>$L_B$<br>ON | (MSP)*<br>$L_E$<br>OFF |
| 2 | (5)*<br>$L_B$<br>ON | (5)→(MSP)<br>OFF  $L_E$ |
| 3 | (5)*<br>$L_B$<br>ON | (MSP)→(5)<br>$L_E$<br>OFF |
| 4 | (MSP)* long<br>$L_B$<br>ON | (MSP)*<br>$L_E$<br>OFF |
| 5 | (MSP)*<br>$L_B$<br>ON | (5)*<br>$L_E$<br>OFF |
| 6 | (MSP)*<br>$L_B$<br>ON | (5)→(MSP)<br>OFF  $L_E$ |
| 7 | (MSP)*<br>$L_B$<br>ON | (MSP)→(5)<br>$L_E$<br>OFF |
| 8 | (5)→(MSP)<br>$L_B$<br>ON | (MSP)*<br>$L_E$<br>OFF |
| 9 | (MSP)hold→(5)<br>$L_B$    ON | (MSP)* rel.<br>$L_E$<br>OFF |
| 10 | (5)→(MSP)<br>$L_B$<br>ON | (5)*<br>$L_E$<br>OFF |
| 11 | (MSP)→(5)<br>$L_B$    ON | (5)*<br>$L_E$<br>OFF |
| 12 | (5)→(MSP)<br>$L_B$<br>ON | (5)→(MSP)<br>OFF  $L_E$ |
| 13 | (5)→(MSP)<br>$L_B$<br>ON | (MSP)→(5)<br>$L_E$<br>OFF |
| 14 | (MSP)→(5)<br>$L_B$    ON | (5)→(MSP)<br>OFF  $L_E$ |
| 15 | (MSP)→(5)<br>$L_B$    ON | (MSP)→(5)<br>$L_E$<br>OFF |
| 16 | (5)* long<br>$L_B$<br>ON | (MSP)*<br>$L_E$<br>OFF |

The abbreviations $L_S$, $L_E$, ON, OFF, →, and * are defined as in Table 2.

The typical combinations of user operations listed in Table 5 according to the alternative 2 shown in FIG. 3 are immediately understandable. For further explanation, some examples for operation sequences and the allocated functions are given below.

Example according to Table 5, line 1:

Start of learning ($L_S$):

Exclusive operation of (5). The control unit 8 is, in this case, so designed that with every operation of the operation means (5) resulting in opening the shut-off device 7 (ON) (first function) a detection and buffering of the quantity information is effected (second function).

End of learning ($L_E$):

By operating (MSP), in case of multiple storage allocation elements (MSP1, MSP2, MSP3, . . . ) by operating a selected storage location element (e.g. MSP2), the shut-off device 7 is closed (OFF) (second function). Further, the storage of the present quantity information is initialised (first function). The end of the learning process $L_E$ is reached with the storage of the quantity data on operation of (MSP).

Example according to Table 5, line 2:

Start of learning ($L_S$):

For the start of the learning process the same applies as for the example according to Table 5, line 1.

End of learning ($L_E$):

By operation of the operation means (5) the shut-off device 7 is closed (OFF). By the subsequent operation of the storage allocation element (MSP) the storage is initialised, whereafter the end of the learning process is effected.

Example according to Table 5, line 8:

Start of learning ($L_S$):

By operation of (5) the shut-off device 7 is opened (ON), and the learning mode is started. By subsequent operation of (MSP) the quantity information to be learned is allocated to one of the storage allocation elements (MSP) (MSP1, MSP2, MSP3, . . . ).

End of learning ($L_E$):

The repeated operation of (MSP) first results in the shut-off device 7 being closed (OFF) and then in the storage of the present quantity information in accordance with the allocation to the selected storage allocation element (MSP) (e.g. MSP2).

Example according to Table 5, line 10:

Start of learning ($L_S$):

As for the start of the learning process, the same applies as explained in the previous example according to Table 5, line 8.

End of learning ($L_E$):

On Operation of (5), first the shut-off device 7 is closed (OFF) (first function), and the storage of the quantity information is effected in accordance with the selected storage allocation element (MSP) (e.g. MSP2).

Example according to Table 5, line 11:

Start of learning ($L_S$):

By operating (MSP) the learning mode is started, an allocation to a storage allocation element (MSP) (e.g. MSP2) being effected. By a subsequent operation of (5) the shut-off device 7 is opened by the control unit 8 (ON).

End of learning ($L_E$):

On operation of (5) the shut-off device 7 is closed (OFF) (first function); thereafter the storage of the quantity information now present is effected in accordance with the allocation to the selected storage allocation element (MSP) (e.g. MSP2), whereby the learning mode is terminated.

Example according to Table 5, line 14:

Start of learning ($L_S$):

Here, the same applies as in the previous example according to Table 5, line 11.

End of learning ($L_E$):

By operating (5) the shut-off device 7 is closed (OFF). The subsequent repeated operation of the selected storage allocation element (MSP) (e.g. MSP2) results in the storage of the quantity information in accordance with the selected storage allocation element (MSP) (e.g. MSP2).

Example according to Table 5, line 15:

Start of learning ($L_S$):

Here, the same applies as in the example according to Table 5, line 11.

End of learning ($L_E$):

The second operation of (MSP) results in the allocation of the quantity information (which is not yet available at that time) to a selected storage allocation element (MSP). The operation of (5) results in the closure of the shut-off device 7 (OFF) and the storage of the now present quantity information in accordance with the allocation to the selected storage allocation element (MSP) (e.g. MSP2).

Example according to Table 5, line 16:

Start of learning ($L_S$):

Exclusive operation of (5). The control unit 8 is designed so that with every operation of (5) during a given period which results in the opening of the shut-off device 7 (ON) (first function) a detection and buffering of the quantity information is also effected (second function).

End of learning ($L_E$):

For the end of the learning process the same applies as for the example according to Table 5, line 1.

In the second alternative of the concept of the memory input means 9 discussed above and shown in FIG. 3 the dosing mode, i.e. the reproduction of a stored quantity information, is, with an according design of the control unit 8, respectively, particularly initialised by the following user operations and the allocated function:

| | | |
|---|---|---|
| 1. | | (MSP) |
| | or | |
| 2. | | (MSP) long / hold |
| | or | |
| 3. | | (MSP) → (5) |
| | or | |
| 4. | | (5) → (MSP) |

It is to be understood that, within the framework of the concept of the invention, of course the operation of operation means or user operations provided for the learning mode in the control unit 8, e.g. on the software level, have to be adapted to the operation of operation means or the user operations provided for the dosing mode as well as for the "normal water tap function". The user operations for the learning mode listed in Tables 2 and 5 require a corresponding appropriate selection of an operation sequence in the dosing mode. This correlation between the user operation(s) in the learning mode and the user operation(s) in the dosing mode or during the normal valve function of the apparatus can easily be handled by anyone skilled in the art. For every correctly provided user operation or sequence of user operations in the learning mode one or more related and compatible user operations may be selected for the dosing mode and the normal valve operation.

In the following Tables 6 and 7 typical examples for this correlation are given.

TABLE 6

Alternative 1

| Learning Mode | | Dosing Mode |
|---|---|---|
| at learning start | at learning end | |
| (M) → (5)<br>$L_B$  ON | (5) → (SP)<br>OFF  $L_E$ | (SP)<br>ON |
| (M) → (5)<br>$L_B$  ON | (SP) → (5)<br>$L_E$<br>OFF | (SP)<br>ON |

TABLE 7

Alternative 1

| Learning Mode | | Dosing Mode |
|---|---|---|
| at learning start | at learning end | |
| (MSP) → (5)<br>$L_B$  ON | (5) *<br>$L_E$<br>OFF | (MSP)<br>ON |
| (5) *long<br>$L_B$<br>ON | (MSP) *<br>$L_E$<br>OFF | (MSP)<br>ON |

Figure 4:
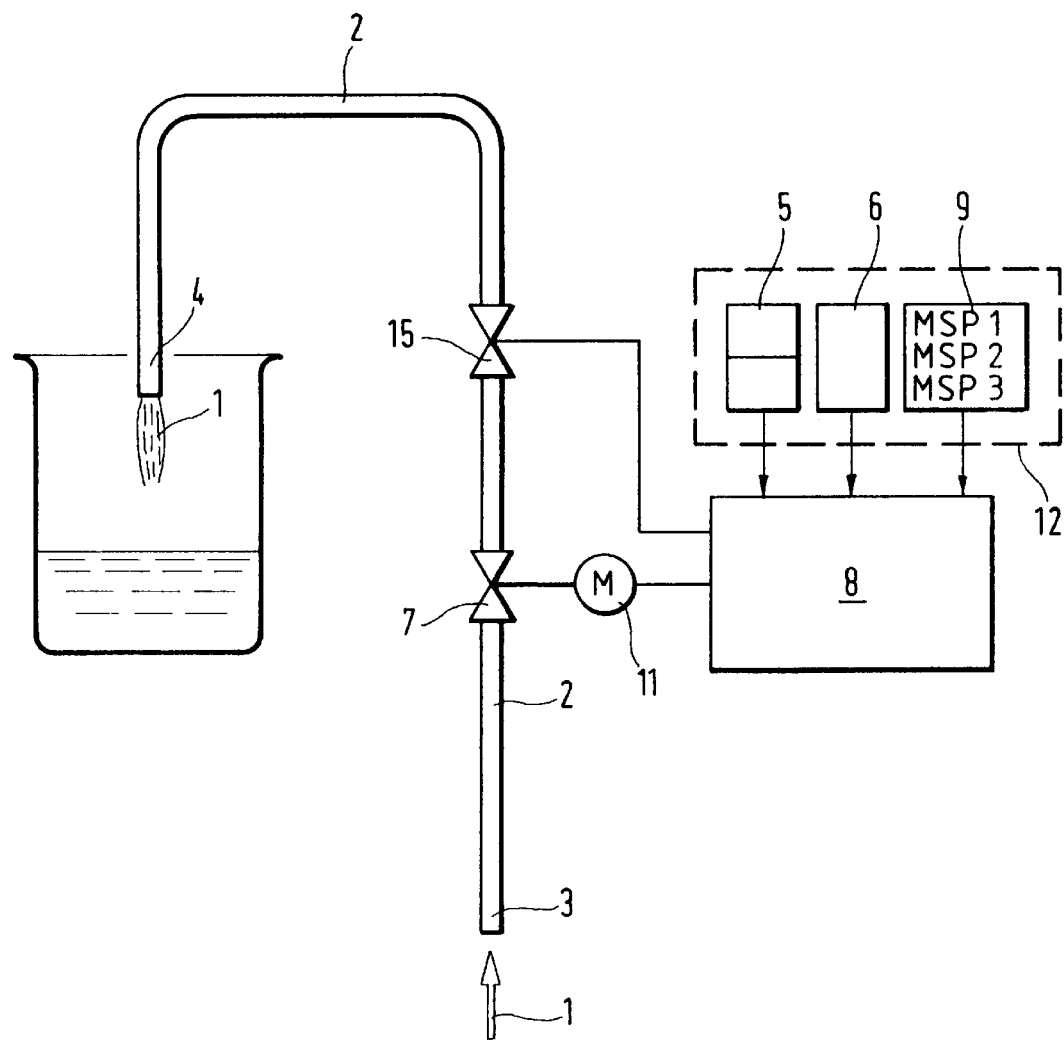

In FIG. 4 an apparatus according to the present invention is shown the shut-off device 7 of which is a control device adjustable continuously or stepwise between the fully closed state and the fully opened state via an actuator drive 11 controlled by the control unit 8.

The regulating means is particularly a flap, a slider, or a valve. Such control means are known in the art. A safety shut-off device 15 is provided downstream of the shut-off device 7, which safety shut-off device 15 is also controlled by the control unit 8. The safety shut-off device 15 is a flow switch and particularly a magnetic valve in the apparatus according to FIG. 4.

The control unit 8 in the apparatus according to FIG. 4 is so designed that, in the learning mode as well as in the dosing mode and also with the normal valve function, at the beginning of a metering operation, first the safety shut-off device 15 and then the shut-off device 7 is opened, and that, at the termination of a metering operation, first the shut-off device 7 and then the safety shut-off device 15 is closed.

The other elements of the apparatus are identical to those according to FIGS. 1, 2, and 3 and specified by the same numerals.

The operation elements (the operation means 5 and the memory input means 9) located in the operating board 12 correspond to the arrangement of FIG. 3 and thus the second alternative discussed above. In addition, however, a flow rate input element 6 is provided for the introduction of a desired fluid flow (fluid flow rate V̇), the flow rate input element 6 transmitting signals to the control unit 8 on operation, due to which signals the shut-off device 7 (e.g. in case of a flow switch register as in FIGS. 2(a) and (b)) and/or a control or regulating device (a flow switch register, a control valve) located upstream or downstream of the shut-off device 7 and controlled by the control unit 8 determines the selected flow rate. The flow rate input element 6 may, for example, in simplest case, consist of several keys to which different pre-set fluid flow rates are functionally allocated. The flow rate input element 6 may also consist of a single key or button combined with a display, e.g. several light emitting diodes which in turn are allocated to different fluid rates and are controlled by the control unit 8, the display sequentially jumping from one light emitting diode to the next in a closed cyclic run on each operation of the key. Another advantageous option consists in forming the flow rate input element 6 in co-operation with the control unit 8 so that by holding this operation means for a longer or shorter time the flow rate of the fluid may be changed or adjusted continuously or stepwise, the adjustment means (increase/decrease) and/or the current state (e.g. "much", "medium", "little" or corresponding symbols (l/min) being displayable on the operating board 12.

The control unit 8 may co-operate with the flow rate input means 6 in different ways. In the simplest case, the operation of the flow rate input element 6 is independent of the operations required for the learning and dosing modes as well as the normal valve function and is carried out previous to the operation of the operation means 9 and/or memory input means 9 (independent pre-selection of the flow rate of the fluid).

There may also be provisions for an inclusion of the flow rate input element 6 into the operation sequences of the operation means 5 and 9. For an operation of the flow rate input element 6 numerous operation sequences arise, some of which are shown in Tables 8 and 9.

TABLE 8

Alternative 1

| Learning Mode | | Dosing mode |
|---|---|---|
| at learning start | at learning end | |
| (6) → (M) → (5)<br>$L_B$  ON | (5) → (SP)<br>OFF  $L_E$<br>or<br>(SP) → (5)<br>$L_E$<br>OFF | (5) or (6) → (SP)<br>ON<br>or<br>(SP) → (5) or (6)<br>ON |
| (6) → (M) → (5)<br>$L_B$  ON | | (SP)<br>ON |
| (M)→(6)→(5)<br>$L_B$  ON | | (5) or (6) → (SP)<br>ON<br>or<br>(SP) → (5) or (6)<br>ON |
| (M) → (6) → (5)<br>$L_B$  ON | | (SP)<br>ON |

TABLE 9

Alternative 2

| Learning Mode | | Dosing mode |
|---|---|---|
| at learning start | at learning end | |
| (6) → (MSP) → (6)<br>$L_B$  ON | (5)*<br>$L_E$<br>OFF | (5) or (6) → (MSP)<br>ON<br>or<br>(MSP) → (5) or (6)<br>ON |
| (6) → (MSP) → (5)<br>$L_B$  ON | (5)*<br>$L_E$<br>OFF | (MSP)<br>ON |
| (MSP) → (6) → (5)<br>$L_B$  ON | (5)*<br>$L_E$<br>OFF | (5) or (6) → (MSP)<br>ON<br>or<br>(MSP) → (5) or (6)<br>ON |
| (MSP) → (6) → (5)<br>$L_B$  ON | (5)*<br>$L_E$<br>OFF | (MSP)<br>ON |

TABLE 9-continued

Alternative 2

| Learning Mode | | |
|---|---|---|
| at learning start | at learning end | Dosing mode |
| (6) → (5)* long<br>L_B<br>ON | (MSP)*<br>L_E<br>OFF | (5) or (6) → (MSP)<br>ON<br>or<br>(MSP) → (5) or (6)<br>ON |
| (6) → (5)* long<br>L_B<br>ON | (MSP)*<br>L_E<br>OFF | (MSP)<br>ON |

The above tables 8 and 9 show in an exemplary form how the operation of the flow rate input element 6 and the related functions may be integrated into the operating sequence.

In this case it is very advantageous to store also the flow rate information corresponding to the selected flow quantity (flow rate) according to the operation of the flow rate input element 6 in accordance with the allocation to the quantity information in the learning mode so that in the dosing mode no additional input of a flow rate by operating (6) is required. This can be seen from Table 8, lines 2 and 4, and Table 9, lines 2, 4, and 6.

The abbreviation "$L_B$", according to the above definition, concerns the start of the learning process related to the quantity information. In the operating sequences according to Tables 8 and 9 in which, in the learning mode, (6) is operated as the first operation element at the start of the learning process (Table 8, lines 1 and 2, Table 9, lines 1, 2, 5, and 6), the related learning start concerning the selected flow rate is effected with the operation of (6).

According to an advantageous embodiment of the apparatus according to the invention, in addition to the input of a flow rate information, the ON function and, if necessary, also the OFF function of the operating means 5 are allocated to the flow rate input element 6. In this way, a simplification of the operation is obtained.

In the following Tables 10 and 11, some typical operating sequences for the two alternatives 1 and 2 are shown.

TABLE 10

Alternative 1

| Learning Mode | | |
|---|---|---|
| at learning start | at learning end | Dosing mode |
| (M) → (6)<br>L_B    ON | (5) → (SP)<br>OFF   L_E<br>or<br>(SP) → (5)<br>L_E<br>OFF<br>or<br>(6) → (SP)<br>OFF   L_E<br>or<br>(SP) → (6)<br>L_E<br>OFF | (6) → (SP)<br>ON<br>or<br>(SP) → (6)<br>ON<br>or<br>(SP)<br>ON |

TABLE 11

Alternative 2

| Learning Mode | | |
|---|---|---|
| at learning start | at learning end | Dosing mode |
| (MSP) → (6)<br>L_B    ON | (5)*<br>L_E<br>OFF<br>or<br>(6)*<br>L_E<br>OFF | (6) → (MSP)<br>ON<br>or<br>(MSP) → (6)<br>ON<br>or<br>(MSP)<br>ON |

In the "normal water tap operation" in which only the shut-off device 7 is switched on or off it is preferable to include a present flow rate input element 6 in it, too.

Typically, such operating sequences, without initiating or carrying out a learning mode, may, for example, be as following:

| | | | | |
|---|---|---|---|---|
| (6) | → | (5)<br>ON<br>or | → | (5)<br>OFF |
| (5) | → | (6)<br>ON<br>or | → | (5)<br>OFF |
| (6) | → | (5)<br>ON<br>or | → | (6)<br>OFF |
| (5) | → | (6)<br>ON<br>or | → | (6)<br>OFF |
| (6) | hold<br>ON<br>or | | → | (6)<br>OFF |
| (6) | hold<br>ON | | → | (5)<br>OFF |

Further, there may be provisions for the case that in the normal valve function of the apparatus according to the invention, if only the operation means 5, but not the flow rate input element 6, is operated for opening the shut-off device 7, a flow rate pre-set by the apparatus, e.g. an average flow rate, is realised.

The design of the control means 8 concerning in particular the software for realising the functions discussed in connection with the flow rate input element 6 and other related functions can, due to the above explanations, be carried out by persons skilled in the art without problems.

Figure 5:
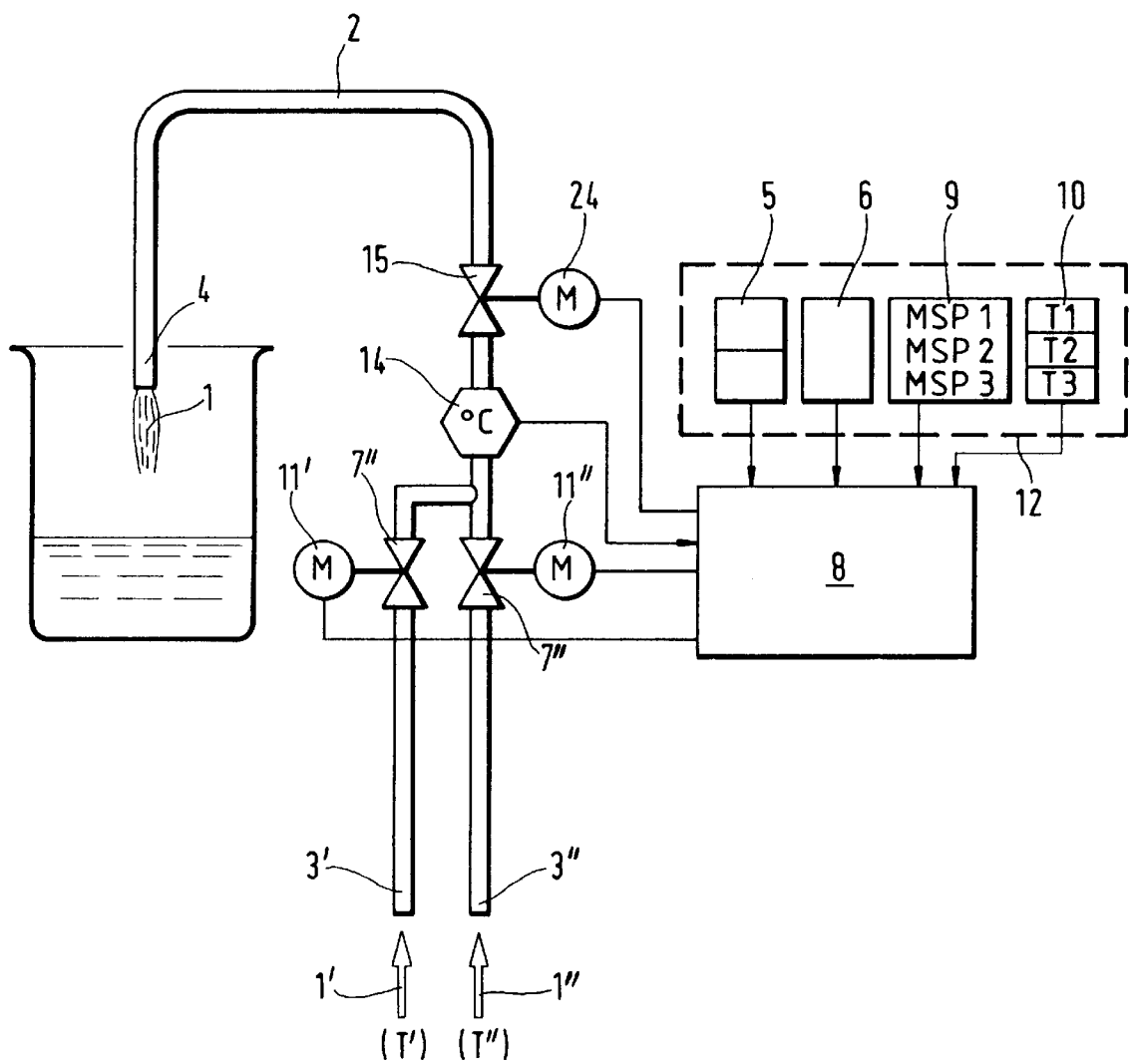

The apparatus shown in FIG. 5 has two shut-off devices 7', 7" connected to two fluid inlets 3', 3" on the inlet side into which two different fluids 1', 1" may be introduced. Preferably, these are water for industrial use with different temperatures (T', T"). The shut-off devices 7', 7" are control means with actuator drives 11', 11" controlled by the control unit 8. They are connected to the fluid line 2 on the outlet side in which a temperature sensor 14 and a safety shut-off device 15 formed as a regulating means with an actuator drive 24 and controlled by the control unit 8 are provided. The temperature sensor 14 is also connected to the control unit 8. The operation elements (5), (6) and (9) of the operating board 12 correspond, in their conception, to those of the arrangement of FIG. 4 discussed in detail above.

The safety shut-off device 15, in this case, is formed as a control means which is, via the actuator drive 24, adjustable between is fully closed and the fully open state continuously or stepwise.

As a further input element a temperature input element 10 is provided in the operating board 12 which, analogous to the flow rate input element 6, serves for inputting a target temperature in the fluid line 2 and at the fluid outlet 4.

With the aid of the temperature sensor 14 detecting the actual temperature and the shut-off devices 7', 7" a closed temperature control circuit can be realised via the control unit 8.

The temperature input element 10 may be formed in the same way as the flow rate input element 6 described above. The target temperature (T1, T2, T3, . . . ) predetermined in this way is realised more or less accurately by driving the actuator drives 11', 11" correspondingly in the sense of a mixer function depending on the selected control characteristic.

In this arrangement, the flow rate of the fluid predetermined by the flow rate input element 6 may be generated by the control unit 8 and the shut-off device 7', 7" at the same time since the ratio between the flow rates of the fluids 1', 1", the resulting mixing temperature and the total of the two flow rates approximately correspond to the desired total flow rate.

The operation of the temperature input element 10 may, as it is also possible with the flow rate input element 6, be carried out independently of the actual operating sequence of the operation elements (5) and (9), the operation of the temperature input element 10 preferably preceding the operation of the other operation elements (5) and (9), namely, before or after a preceding operation of the flow rate input element 6.

Examples for typical operating sequences including the flow rate input element 6 and the temperature input element 10 for the alternatives 1 and 2 are shown in the following Tables 12 and 13 which relate to operating sequences in which the operating elements (6) and (10) have no double function (no additional ON and/or OFF functions of (5)).

TABLE 12

Alternative 1

Learning Mode

| at learning start | at learning end | Dosing mode |
|---|---|---|
| (10)→(6)→(M)→(5)<br>$L_B$   ON | (5) → (SP)<br>OFF   $L_E$<br>or<br>(SP) → (5)<br>$L_E$<br>OFF | (10)→(5) or (6)→(SP)<br>ON<br>or<br>(10)→(SP)→(5) or (6)<br>ON |
| (M)→(10)→(6)→(5)<br>$L_B$     ON | | (SP)<br>ON |
| (M)→(10)→(6)→(5)<br>$L_B$     ON | | (10)→(5) or (6)→(SP)<br>ON<br>or<br>(10)→(SP)→(5) or (6)<br>ON |
| (M)→(10)→(6)→(5)<br>$L_B$     ON | | (SP)<br>ON |

TABLE 13

Alternative 2

Learning Mode

| at learning start | at learning end | Dosing mode |
|---|---|---|
| (10)→(6)→(MSP)→(5)<br>$L_B$     ON | (5)*<br>$L_E$<br>OFF | (10)→(5) or<br>(6)→(MSP)<br>ON<br>or<br>(10)→(MSP)→(5) or<br>(6)<br>ON |
| (10)→(6)→(MSP)→(5)<br>$L_B$     ON | (5)*<br>$L_E$<br>OFF | (MSP)<br>ON |
| (MSP)→(10)→(6)→(5)<br>$L_B$     ON | (5)*<br>$L_E$<br>OFF | (10)→(5) or<br>(6)→(MSP)<br>ON<br>or<br>(10)→(MSP)→(5) or<br>(6)<br>ON |
| (MSP)→(10)→(6)→(5)<br>$L_B$     ON | (5)*<br>$L_E$<br>OFF | (MSP)<br>ON |
| (MSP)→(6)→(5)* long<br>$L_B$<br>ON | (MSP)*<br>$L_E$<br>OFF | (10)→(5) or (6)→(MSP)<br>ON<br>or<br>(10)→(MSP)→(5) or (6)<br>ON |
| (10)→(6)→ (5)* long<br>$L_B$<br>ON | (MSP)*<br>$L_E$<br>OFF | (MSP)<br>ON |

Within the framework of the present invention it is particularly preferable to store the information corresponding to the inputs of (10) and (6) in the learning mode in accordance with the quantity information as in the dosing mode these inputs concerning the flow rate and the temperature of the fluid to be dosed are no longer required and metering is possible by operating a single operating element (Table 12, lines 2 and 4: (SP); Table 13, lines 2, 4 and 6: (MSP)) in the dosing mode.

The design of the metering system of the invention such that the flow rate input element 6 also performs the ON function of (5) and, if necessary, the OFF function as well (compare Tables 10 and 11), is advantageous even if the temperature input element 10 is additionally provided.

The ON function of (5) and, if necessary, the OFF function as well may alternatively be allocated to the temperature input means 10.

In the Tables 14 and 15 below, some such typical operating sequences are listed for the two alternatives 1 and 2.

TABLE 14

Alternative 1

Learning Mode

| at learning start | at learning end | Dosing mode |
|---|---|---|
| (10)→(M)→(6)<br>$L_B$   ON<br>or<br>(6)→(M)→(10)<br>$L_B$     ON<br>or<br>(M)→(6)→(10)→(5)<br>$L_B$      ON<br>or<br>(M)→(10)→(6) | (5)→(SP)<br>$L_E$<br>OFF<br>or<br>(SP)→(5)<br>$L_E$<br>OFF<br>or<br>(6)→(SP)<br>OFF   $L_E$ | (10)→(5) or (6)→(SP)<br>ON<br>or<br>(10)→(SP)→(5) or (6)<br>ON<br>or<br>(SP)→(5)<br>ON<br>or<br>(SP) |

TABLE 14-continued

Alternative 1

| Learning Mode | | |
|---|---|---|
| at learning start | at learning end | Dosing mode |
| $L_B$   ON<br>or<br>(M)→(SP)→(10) →(6)<br>$L_B$       ON | or<br>(SP)→(5)<br>$L_E$<br>OFF<br>or<br>(SP)*<br>$L_E$<br>OFF<br>or<br>(5)*<br>$L_E$<br>OFF | ON |

TABLE 15

Alternative 2

| Learning Mode | | |
|---|---|---|
| at learning start | at learning end | Dosing mode |
| (10)→(MSP)→(6)<br>$L_B$     ON<br>or<br>(6)→(MSP)→(10)<br>$L_B$     ON<br>or<br>(MSP)→(10)→(6)<br>$L_B$     ON | (5)*<br>$L_E$<br>OFF<br>or<br>(6)*<br>$L_E$<br>OFF<br>or<br>(10)*<br>$L_E$<br>OFF | (5) or (6)→(MSP)<br>ON<br>or<br>(MSP)→(5) or (6)<br>ON<br>or<br>(MSP)<br>ON |
| (10)→(6)→(MSP) hold<br>$L_B$<br>ON | (MSP)* release<br>$L_E$<br>OFF | (MSP)<br>ON |
| (6)→(10)→(5)<br>$L_B$<br>ON | (MSP) longer<br>operation<br>$L_E$<br>OFF | (MSP)<br>ON |

For the normal valve function ("water tap function") of the apparatus as well numerous operating sequences arise in the presence of a flow rate input element 6 and a temperature input element 10, some typical sequences being listed below:

| (6) | → | (10) | → | (5)<br>ON | → | (5)<br>OFF |
|---|---|---|---|---|---|---|
| (10) | → | (6) | → | (5)<br>ON | → | (5)<br>OFF |
| (5) | → | (6) | → | (10)<br>ON | → | (5)<br>OFF |
| (5) | → | (10) | → | (6)<br>ON | → | (5)<br>OFF |

Tables 12 to 15 and the above operating sequences specify only a part of the combinations of operations and corresponding functions possible within the framework of the invention. A person skilled in the art will be able to realise adequate operation sequences from the concept of the invention depending on the specific application.

According to a further advantageous embodiment of the invention, the function of the memory input means 9 (M, SP; MSP) is integrated in the operation means 5; correspondingly, only a single operating means (5) is provided for this functions.

This design of the apparatus of the invention correspondingly results in the normal flow switch function (water tap function) being replaced by the metering function.

Functions and user operations for this very simply operable apparatus, which is, in the simplest case, a "single key" or "single lever" apparatus is discussed with respect to an example below.

Learning Mode:

(5)* long -----> (5)* long or short
$L_B$                    $L_E$
ON                      OFF
                          or
(5) * hold -----> (5) * release
$L_B$                    $L_E$
ON                      OFF The asterisk * again specifies a multiple function as described above, in this case the additional function of (9) (M, SP; MSP).

Dosing mode:

(5) long ———→ (5) long or short
ON                      OFF

The fluid quantity dosed is the fluid quantity learned and stored in the last learning mode (initiated by long pressing/operating of (5)).

The apparatus is advantageously formed such that a basic fluid amount is stored by the manufacturer, said basic fluid amount providing a basis for the execution of the dosing mode without previous storage of a fluid amount effected by learning until an overwrite with a learned fluid amount has been carried out.

This apparatus can easily be operated and is adjusted to numerous applications for such simple dosing functions, e.g. in the sanitary sector for wash basin and shower fittings, urinal flushing systems, etc.

In such systems the flow rate input element 6 and/or the temperature input element 10 may be provided independently so that, due to corresponding user operations, flow rate and temperature of the fluid may be selected.

According to another advantageous embodiment of the invention, the operation means 5 is no input element, such as a key, a button or a light barrier, etc., but functionally combined with the mechanically operable element of a conventional fitting, e.g. the lever of a single-lever mixing battery. In this way it is possible to combine the temperature of the mixed fluid (the function of the temperature input element 10) by turning of the lever and the flow rate (the function of the flow rate input element 6) as well as the ON/OFF function (the function of the operating means 5) by raising and lowering the lever.

A further advantageous embodiment of the concept of the invention consists in that only one memory input means 9, advantageously in the form of one or more storage allocation elements MSP, is provided in connection with a conventional fitting, particularly a single lever mixing battery or similar discharge fittings, and that the control unit 8 is designed such that the amount of water discharged between the opening and the subsequent closing on operation of the water tap (ON/OFF, function of (5)) is buffered and that this amount of water is stored on operation of the storage allocation element MSP (or of the memory command element M and of a storage location element SP) and can be retrieved by operating MSP (or M, SP) in a dosing mode.

Figure 6:
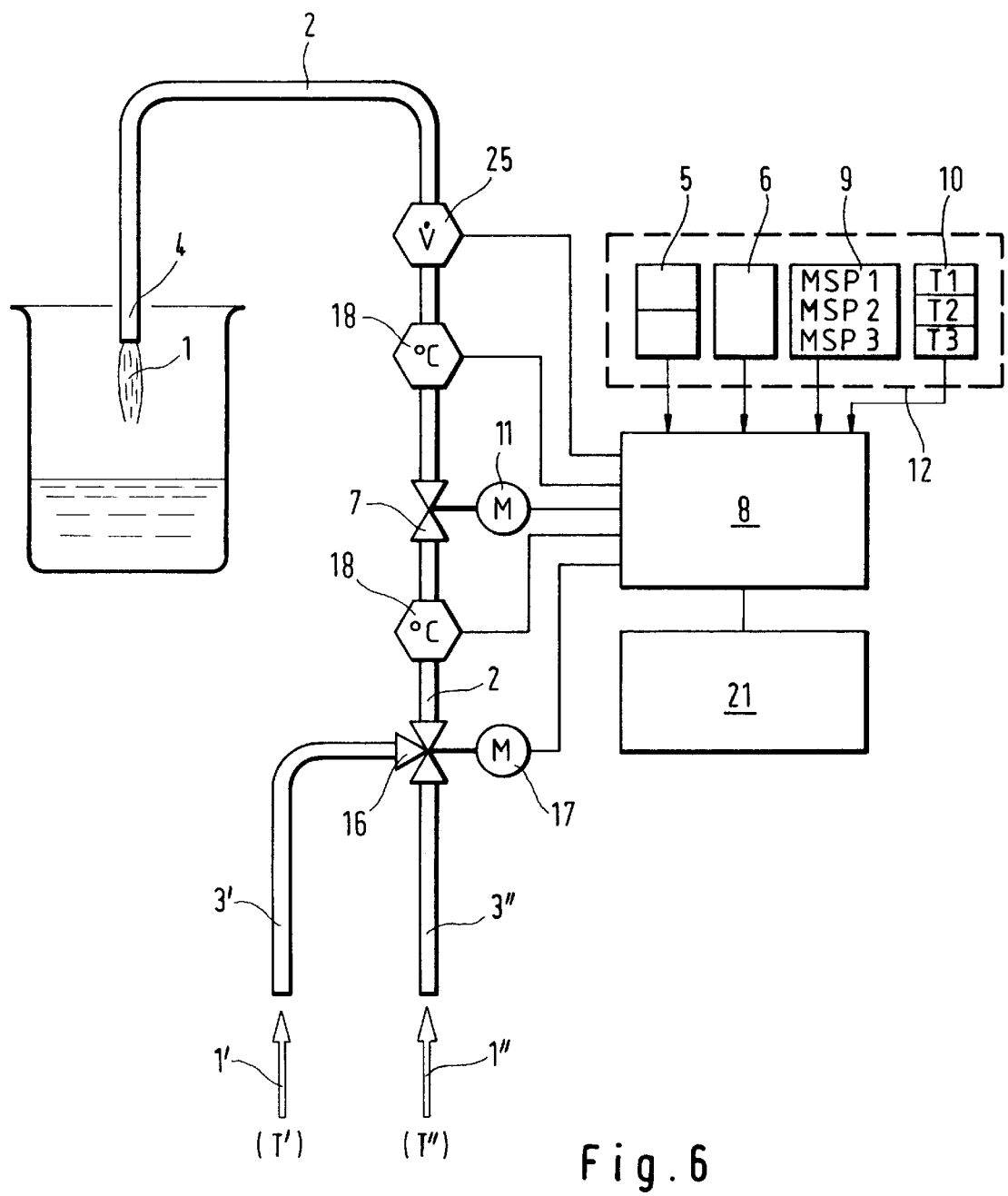

FIG. 6 illustrates an apparatus according to the invention in which a three-way mixer tap 16 provided with an actuator drive 17 and connected to fluid inlets 3', 3" for two different fluids 1', 1" on the inlet side is connected upstream of the shut-off device 7 which is a control device with an actuator drive 11. The two fluids 1', 1" are preferably water of different temperatures (T', T"), as shown in FIG. 5. Together with the temperature sensor 18 and the control unit 8, a closed control circuit is provided, so that a fluid is supplied to the shut-off device 7 the temperature of which can be controlled to the target temperature value entered via the temperature input element 10.

As may be seen from FIG. 6, the temperature sensor 18 may be provided either upstream of downstream of the shut-off device 7 in the direction of the flow.

The operating elements (5), (6), (9) and (10) and their functions are as shown in FIG. 5.

FIG. 6 further shows that a flow rate sensor 25 communicating with the control unit 8 may be provided downstream of the shut-off device 7. In view of a second closed control circuit, the shut-off device 7 may be operated via the control unit 8 such that control is effected to the target flow rate entered via the flow rate input element 6. Therefore, in this example, the shut-off device 7 designed as a control or regulating device has not only the shut-off function and thus the metering function but also controls or regulates the flow rate.

With this arrangement comprising the flow rate sensor 25 further an automatic control or re-scaling of stored dosing amounts discharged in the dosing mode can be effected. If, for example, by calcium deposition, the tube diameter in the fluid line 2 or at the fluid outlet 4 is reduced with time after a learning process and therefore the flow rate obtained per unit time with a given primary pressure is reduced as well, an automatic correction of the stored data, e.g. the opening time of the shut-off device 7, may be effected, preferably with an absolutely operating flow rate sensor 25, which opening time is in this case prolonged such that the metering amount initially learned in one pre-dosing process is correctly discharged independent of the condition of the line.

In this case, the software may be designed such that this self-check and the possibly required re-scaling or updating of memory contents is effected in pre-set time intervals.

Besides, forming the shut-off device 7 as a control device provided with an actuator drive 11 also enables the realisation of arbitrary characteristics for the opening and closing processes in connection with the flow rate sensor 25, for example, to prevent pressure bursts in the line system which occur on an abrupt opening of flow switches such as magnetic valves.

The apparatus shown in FIG. 6 finally is provided with an output unit 28 communicating with the control unit 8. The output unit 21 which may also be provided within the operating board 12 is particularly a display on which particularly temperatures (T, ° C.), flow rates (1/min; kg/min), the allocation of storage locations (SP1, SP2, SP3, . . . ), Masses (kg), volumes (l) and/or times (s, min) related to the learning mode and/or the dosing mode may be displayed in accordance with the allocation to operating means or characteristics of the dosed fluid 1. Advantageously, the output unit 21 may also be a printer and/or be provided with an interface function to enable an integration of the apparatus according to the invention into control or regulating systems, e.g. SPS. The output unit 21 will be "intelligent" according to another advantageous embodiment, that is, it will preferably be provided with a micro computer, and it is designed for an interactive operation by users including optical or acoustic communications, particularly by means of speech recognition and speech generation, according to a further preferred embodiment.

In this way, the apparatus and method of the invention may also be applied in the field of the environment of handicapped persons or senior citizens with particular advantage, where the operation of the operating elements does not necessarily need to be carried out mechanically, but may, for example, be effected acoustically. Also in particular the formation of the operating means 5 together with the control unit 8 as an approach-controlled or presence-controlled switching device is very important, specifically for such applications.

Figure 7:
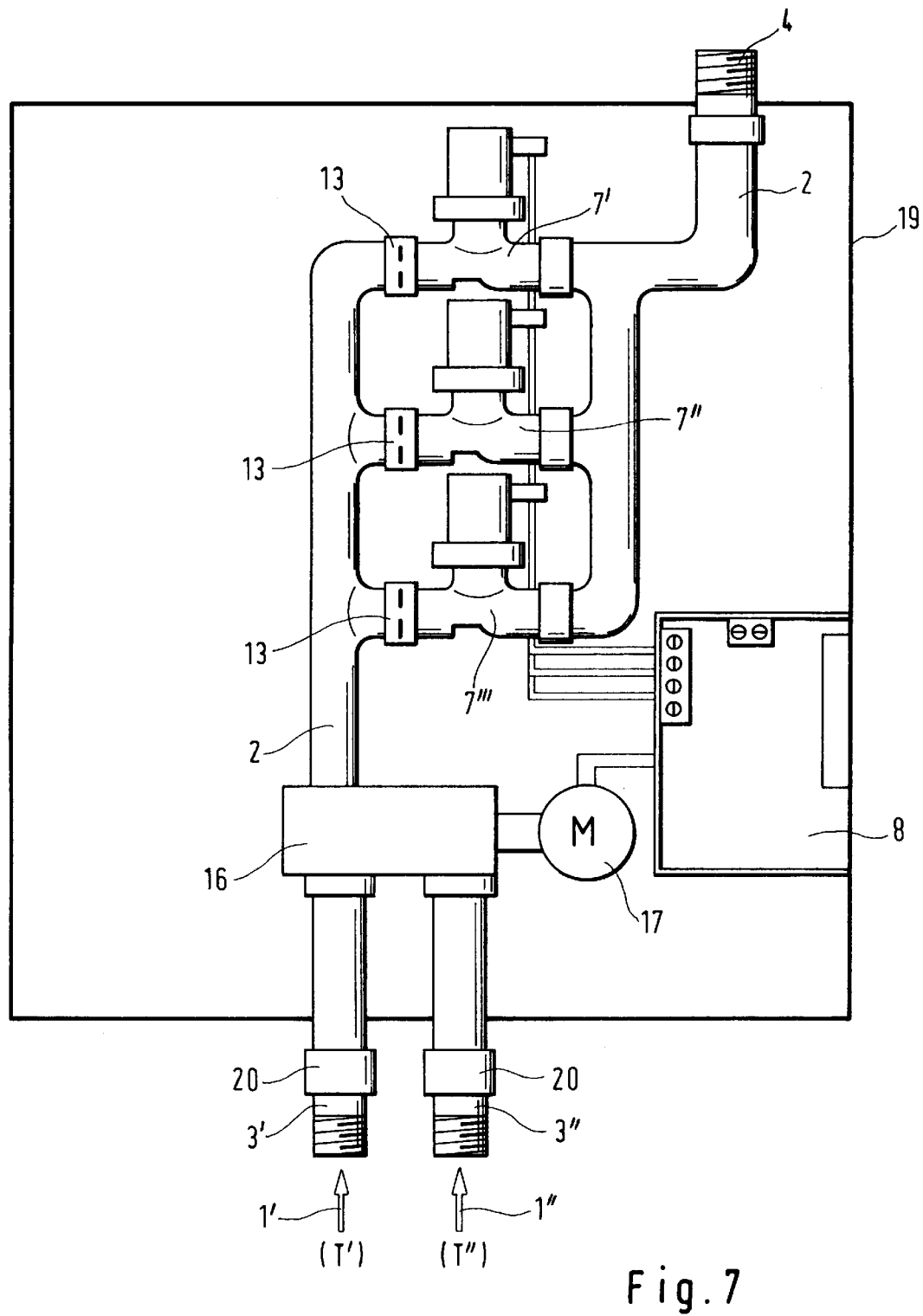

FIG. 7 is a schematic illustration of an apparatus according to the invention, the operation elements or the operating board 12 being omitted. Here, the shut-off device consists of a flow switch register of three magnetic valves 7', 7", 7''' connected in parallel and controlled by the control unit 8, as is the case in FIG. 2(a). On the inlet side flow controllers 13 keeping the flow rates of the fluid in the relevant line branches of the fluid line 2 constant are arranged upstream of the magnetic valves 7', 7", 7'''.

The flow switch register is connected to a three-way mixer tap 16 provided with an actuator drive 17 and controlled by the control unit 8 at the inlet side. Check valves comprising sieves are provided in both fluid inlets 3', 3" for the fluids 1', 1", those check valves being specified by the numeral 20. This construction is also realised in the apparatus of FIG. 6. The two fluids 1', 1" are preferably cold and hot water having the temperatures T', T". The common outlets of the magnetic valves 7', 7", 7''' of the flow switch register open into the fluid outlet 4.

Specifically, the shut-off devices 7', 7", 7''' and the three-way mixer tap 16 are driven according to one of the methods described above.

The partial apparatus shown in FIG. 7 comprising the hydraulic part as well as the sensor part and the control unit 8 of the apparatus of the invention is preferably compact and modular and accommodated in a housing 19. This part of the apparatus of the invention will be arranged at a location which is adequate for the installation and which is, as far as possible, not visible. The connection of the operating board 12 and the module of FIG. 7 or the control unit 8 is usually effected by customary electrical lines for power supply and data transfer. The data transfer may, however, also be advantageously effected in a wireless way by radio transmission, the operating board 12 being provided with an own power supply for energising the electronic devices including the radio transmitter provided therein in this case. The radio receiver will then preferably be arranged in the control unit 8.

The apparatus according to FIG. 7 is not provided with a temperature sensor for controlling the mixing temperature via the three-way mixer tap 16 in a closed control circuit as it is not absolutely necessary and the three-way mixer tap may be so designed or so controlled by the control unit 8 that, for example, a mixer characteristic is stored for every possible flow rate enabling the maintenance of the desired mixing temperature virtually independent of changing flow rates. In this way, the design of the apparatus is simpler and less susceptible to disturbances.

Figure 8:
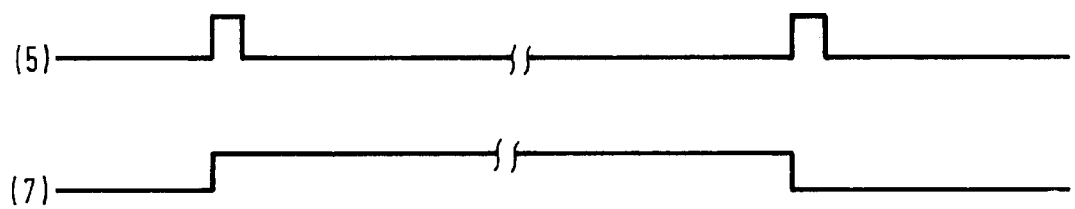
FIGS. 8 and 9: schematic signal diagrams for explaining the learning mode and the dosing mode as well as the allocated activation of the shut-off device and a safety shut-off device.
Figure 8:
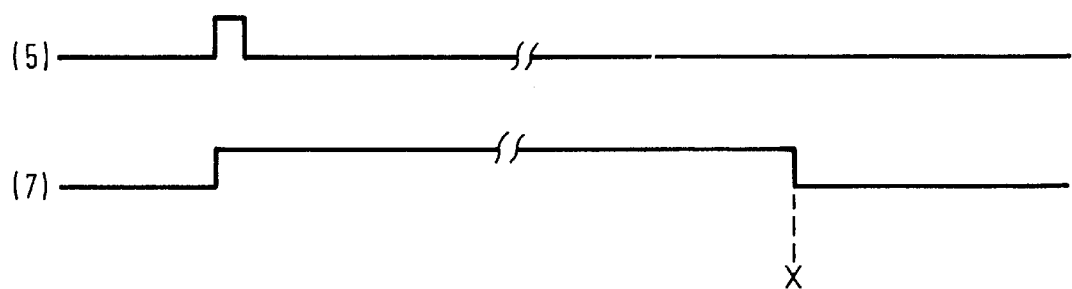

FIG. 8 schematically shows, in the form of signal diagrams, the chronological course of the learning mode (A) and the dosing mode (B) for apparatuses according to the invention, for example, of the type of the apparatus of FIGS. 1, 3 and 7, for an operating sequence in which the shut-off device 7 is opened by (5) via the control unit 8. By shortly operating the operating means 5 the opening of the shut-off device 7 is initialised, the shut-off device 7 being closed again on a subsequent pulse from (5). The different operations required for storing the learned quantity information are not shown here for reasons of simplification.

In the dosing mode the shut-off device 7 is opened due to an operation of (5); after the passage of the fluid amount corresponding to the stored learned quantity information through the apparatus the shut-off device 7 is closed again at a time X without an operation of the operating means (5) or any other operation element.

Figure 9:
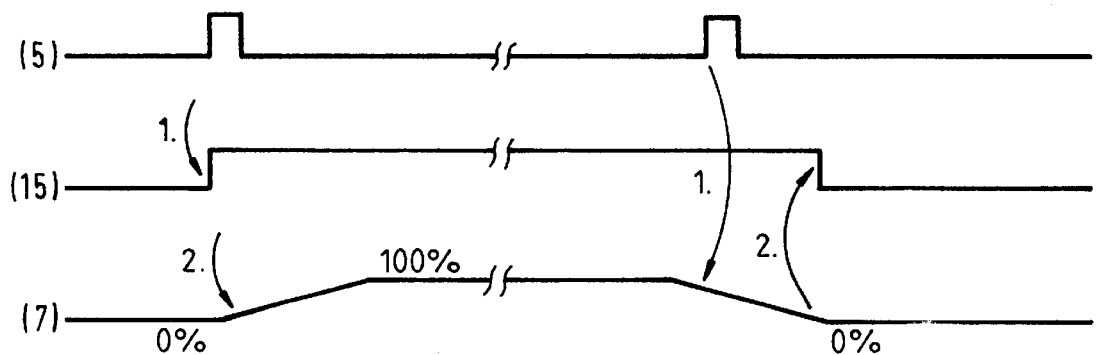
Figure 9:
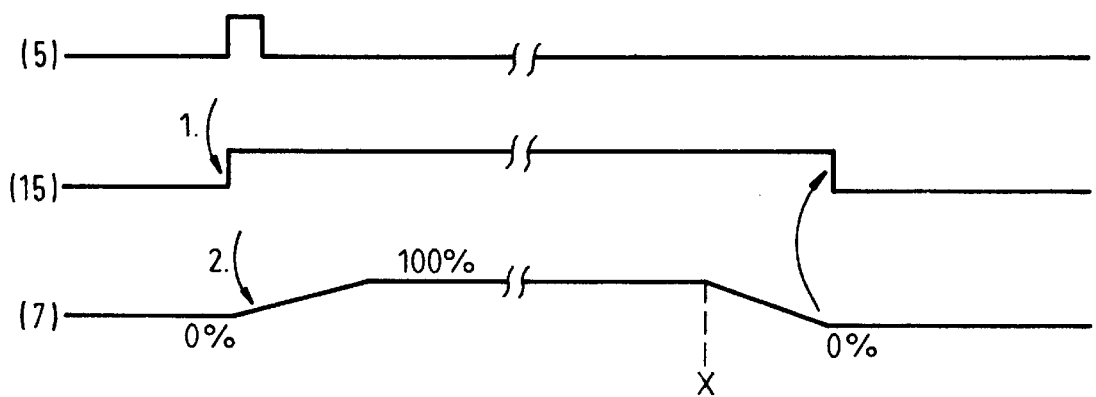

FIG. 9 shows analogous signal diagrams for an apparatus according to the invention provided with a safety shut-off device 15 in which the shut-off device 7 is a control device controlled by the control unit 8 via an actuator drive 8 as, for example, shown in FIGS. 4 and 5.

In the learning mode (A), due to the ON signal from the operating means 5, first, the safety shut-off device 15 is opened (first step) and thereafter the shut-off device 7 which will reach its opened position (100%) after a given time. With the second operation of the operating means 5, due to the OFF signal, first, the shut-off device 7 is returned to the closed position (0%) (first step), and the safety shut-off device 15 is closed after the closed position of the shut-off device 7 is reached (second step).

In the dosing mode (B), due to the ON signal from the operating means 5, first the safety shut-off device 15 and then the shut-off device 7 are opened in the same way as in the learning mode. The closure of the shut-off device 7 after the discharge of the stored dosing amount is again effected automatically at the time X without any external operation of an operating element.

Figure 10:
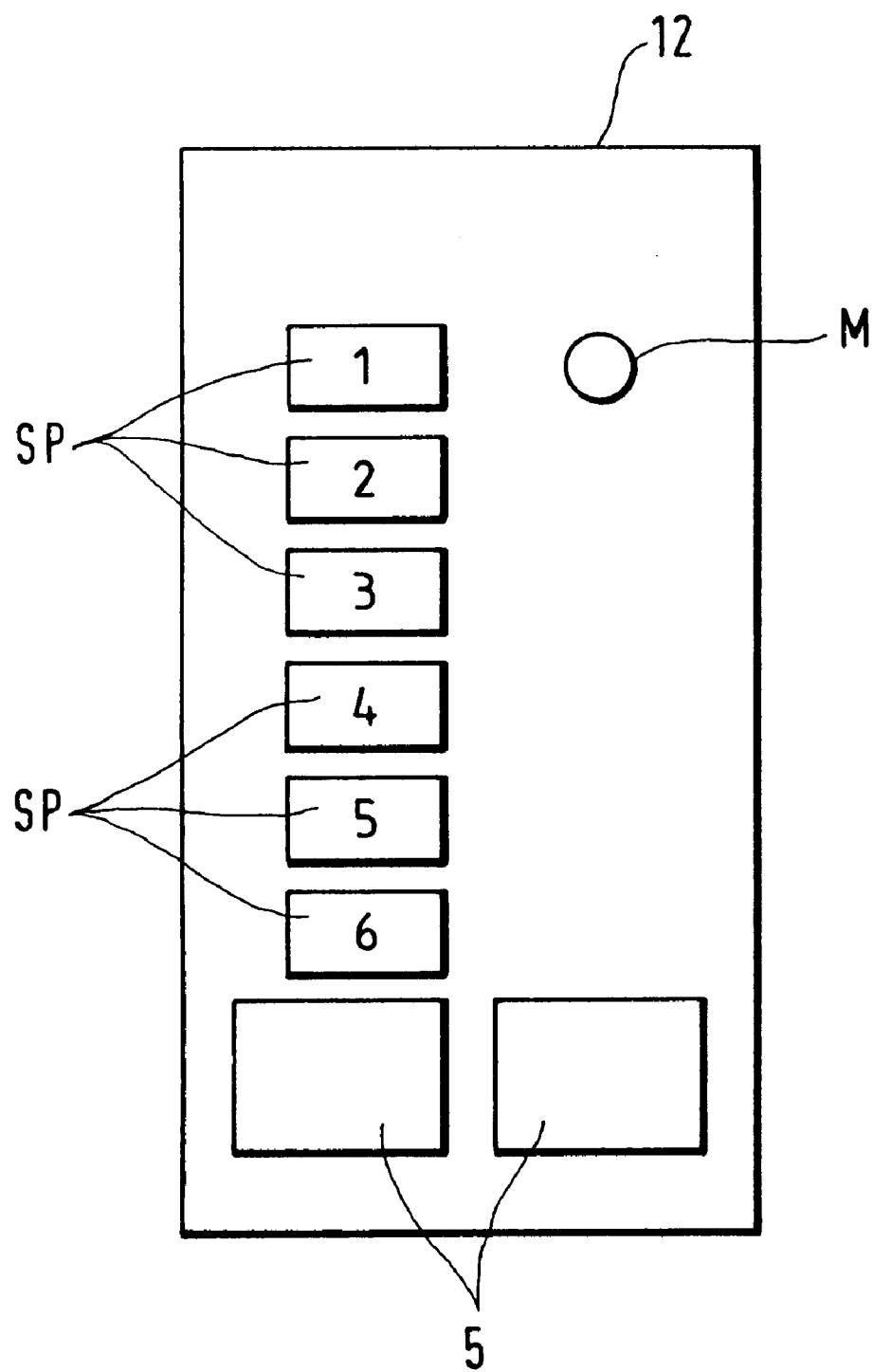
FIGS. 10 to 13: examples for operating boards for apparatuses according to the invention.
Figure 11:
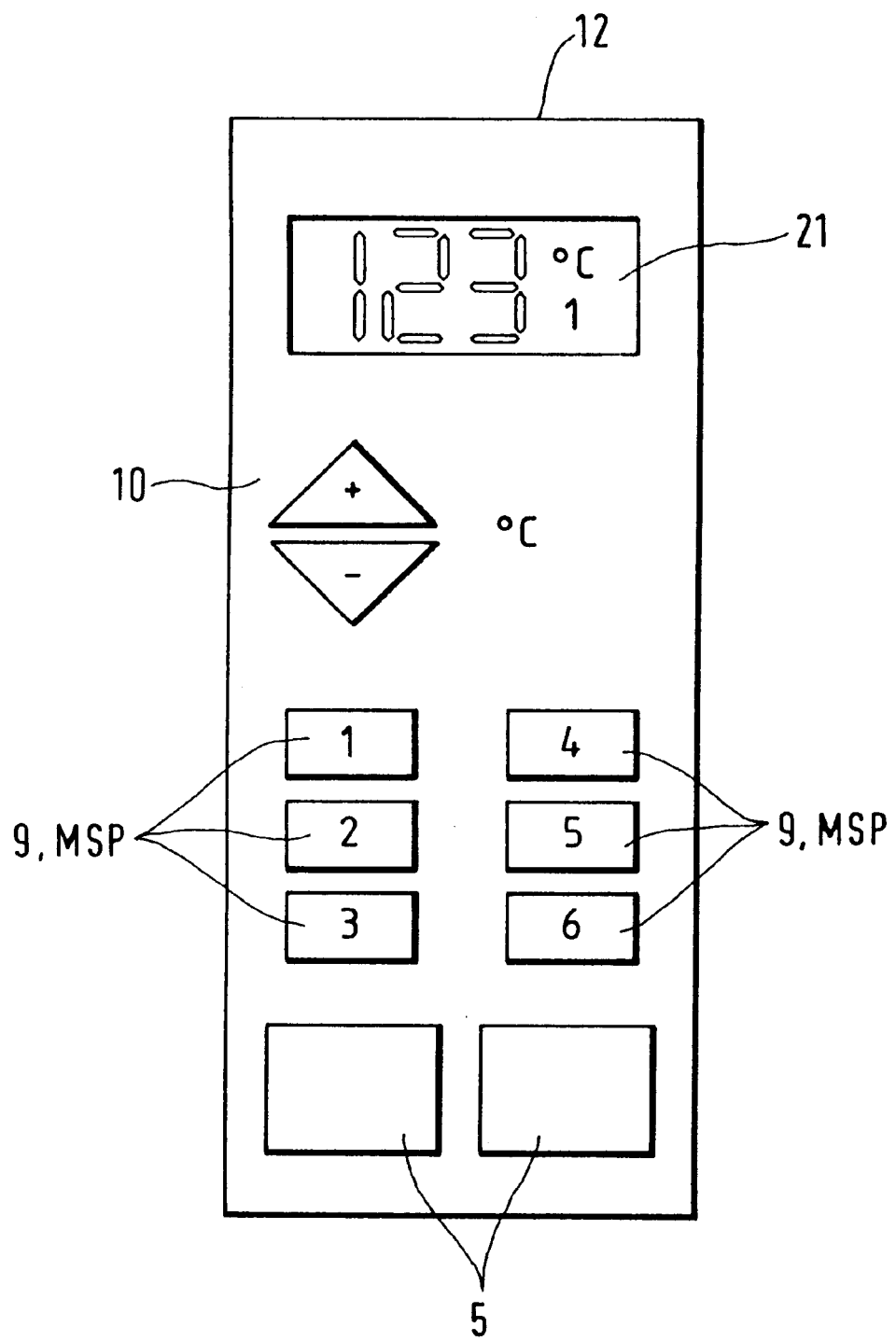
Figure 12:
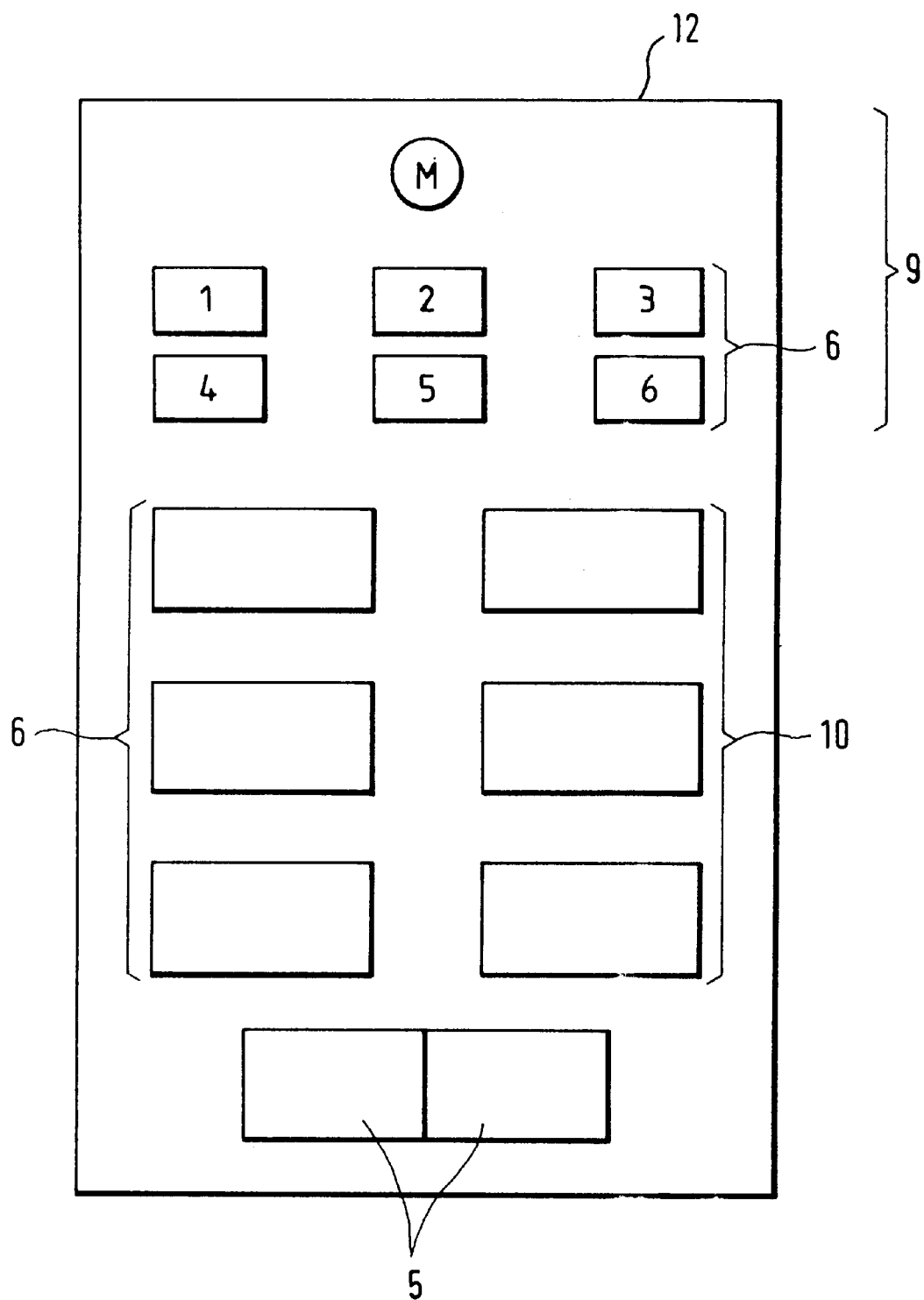

FIGS. 10 to 12 are schematic illustrations of operating boards 12. FIG. 10 is based on the alternative 1 of the storage input means 9 of the invention discussed in detail above (see FIG. 1, for example).

The operating board 12 comprises six keys (1 to 6) as storage location elements SP1, SP2, SP3, SP4, SP5, SP6. The key M corresponds to the memory command element. The operating means 5 comprises an ON key and an OFF key.

The operating board 12 of FIG. 11 corresponds to the alternative 2 of the memory input means 9 of the invention. It comprises six storage allocation elements MSP (1 to 6) which are storage allocation elements MSP1, MSP2, MSP3, MSP4, MSP5, MSP6. In this case as well the operation means 5 is provided in the form of two keys (ON/OFF). The operating board 12 further comprises a temperature input element 10 and an output unit 21 in the form of a display (e.g. a LCD). The temperature input element 10 is provided in the form of an up/down-button, the value of the target temperature being displayed in the output unit 21. In addition, the number of the currently active storage allocation element (No. 1) is displayed.

The operating board 12 of FIG. 12 corresponds to the alternative 1 and FIG. 10 with respect to the memory input means 9 with the exception of the spatial arrangement; in this case as well a memory command element M and six storage location elements SP (1 to 6), SP1, SP2, SP3, SP4, SP5, SP6, as well as an ON/OFF switch or button are provided as operation means 5.

Additionally, this operating board 12 is provided with a flow rate input means 6 consisting of 3 keys ("much", "medium", "little") as well as a temperature input element 10 also comprising three keys ("hot", "medium", "cold").

The functions and the operation sequences of these operation elements were discussed in detail above.

Figure 13:
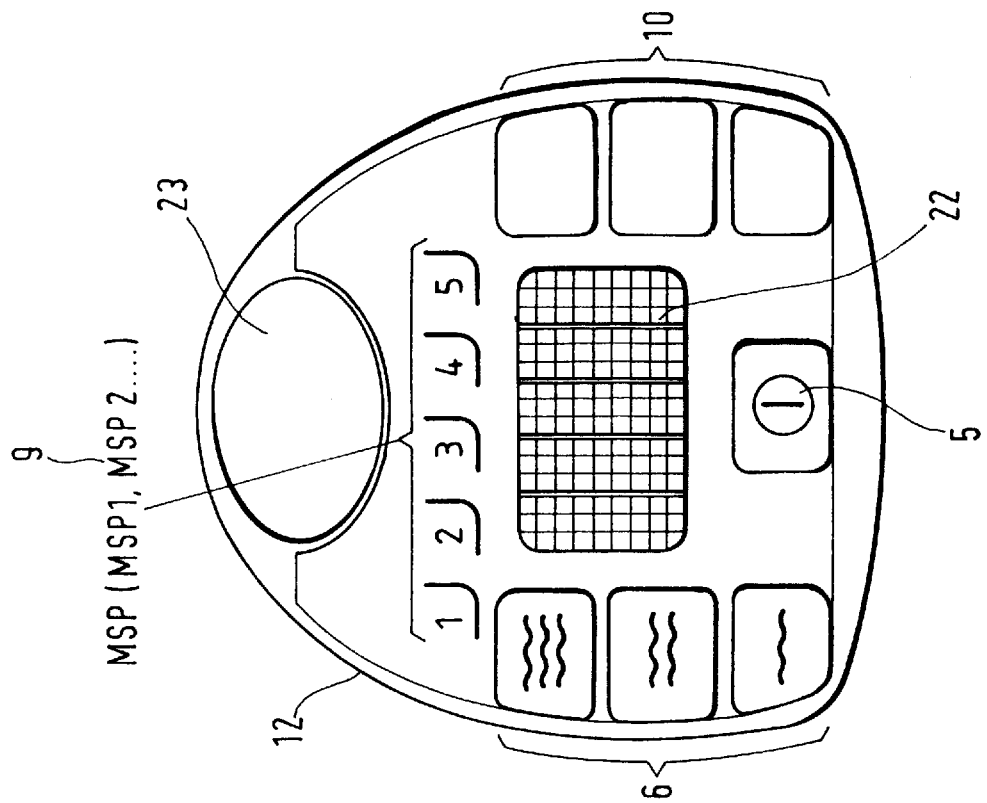
Figure 13:
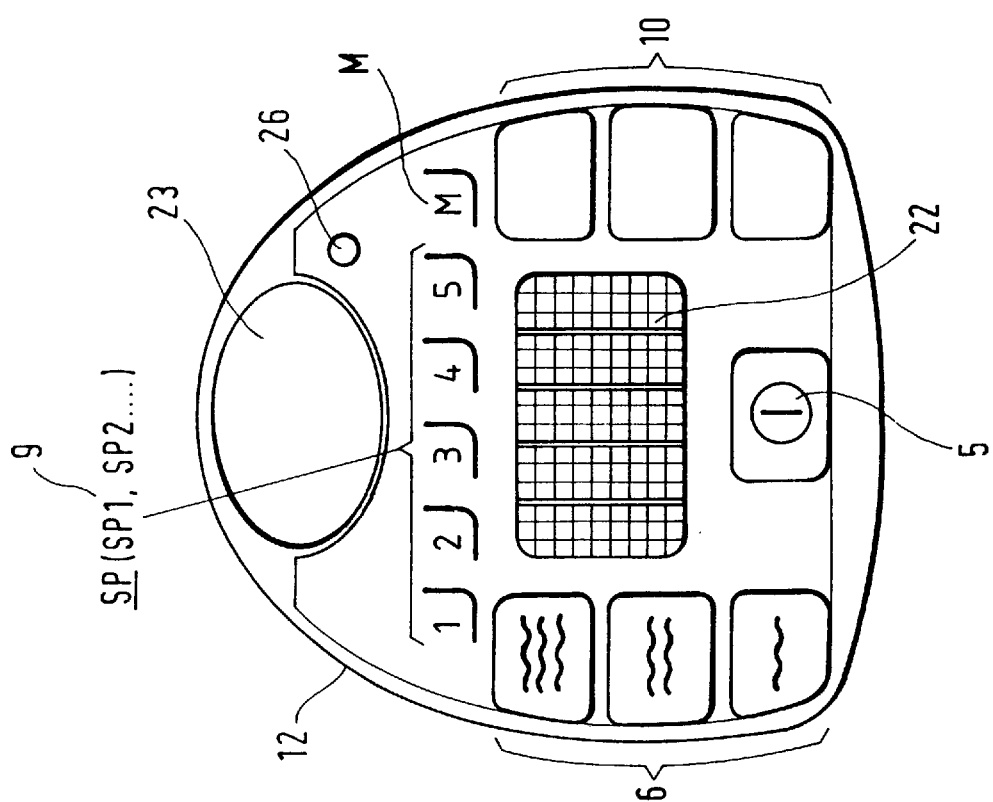

In FIG. 13, operating boards 12 corresponding to two actual embodiments are shown, said operating boards 12 being formed as disk shaped bodies having an opening 23 by means of which they can be detachably mounted to a corresponding catch, e.g. on a discharge fitting. These operating boards 12 are intelligent means independent of power supply due to current supply by means of solar cells 22 and preferably in data connection to the control unit 8 without depending on lines, particularly by means of radio transmission. This may also be effected by optical data transmission, e.g. in the IR range.

FIG. 13(*a*) corresponds to the alternative 1 of the memory input means 9 of the invention, FIG. 13(*b*) to the alternative 2.

FIG. 13(*a*) correspondingly comprises, in analogy to FIG. 12, a memory command element M, five storage location elements SP (SP1, SP2, SP3, SP4, SP5), a light emitting diode 26 illuminated when the storage location element M is activated, a flow rate input element 6 comprising three keys provided with symbols for different flow rates and a temperature input element 10 also comprising three keys provided with symbols for different temperatures in addition to the operation means 5 formed as an ON/OFF button.

FIG. 13(*b*) corresponds to FIG. 13(*a*) with the exception that the alternative 2 of the memory input means 9 consisting of five storage allocation elements MSP (MSP1, MSP2, MSP3, MSP4, MSP5) is realised.

Those operating boards 12 have the advantage that they may be completely separated from the rest of the apparatus and that they may be located or fixed in any location within the radio transmission range or carried by operators or even put into a pocket. Due to the independent current supply in connection with commonly used electrical current storage means a maintenance-free operation in connection with an absolute operation safety over periods of many years is ensured. The operation elements of the operating boards 12 of FIG. 13 are preferably further housed in a waterproof way and manufactured of shock resistant materials so that a long service life is ensured in this respect as well. The operation elements 9 (M, SP; MSP), 5, 6 and 10 comprise keys in this case as well, preferably piezo keys or keys integrated in a foil key board, however, the signals from the operation elements to be transmitted to the control unit 8 are generated by translation into adequate radio code pulses effected in an electronic circuit provided in the operating board 12. Such signal coding as such is known in the field of radio control so that a detailed discussion is not required. The operating board 12 can be provided at a run-out battery or a tap, particularly a sanitary run-out battery or tap, or in the proximity of such a battery or tap, particularly on a wall or concealed in a wall, or the operating board 12 can be adapted to be attached to equipment objects or furniture or for carrying, or in a hand-held form, wherein the power supply of the operating board 12 is preferably via solar cells (22) integrated therein. The operating board 12 can be provided at the outlet of a sanitary run-out battery, and is detachable or removable therefrom, wherein the data transmission between the operating board 12 and the control and detection unit 8 is effected in a cordless manner, particularly through optical data transmission in the visible range or the infrared range of the spectrum or through data transmission via radio communication.

Figure 14:
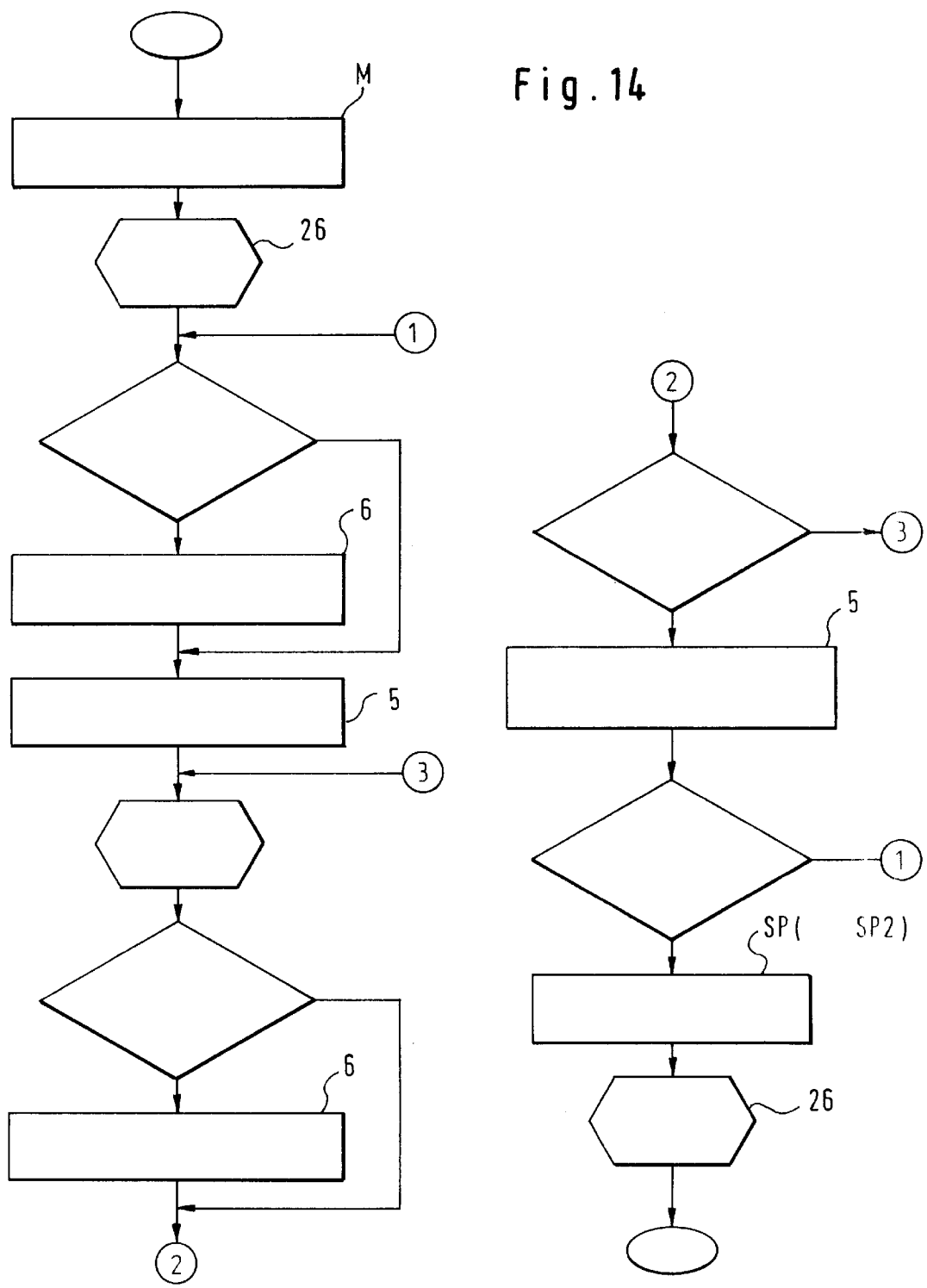
FIGS. 14 and 15: flow diagrams for explaining the learning mode and the dosing mode, respectively.
Figure 15:
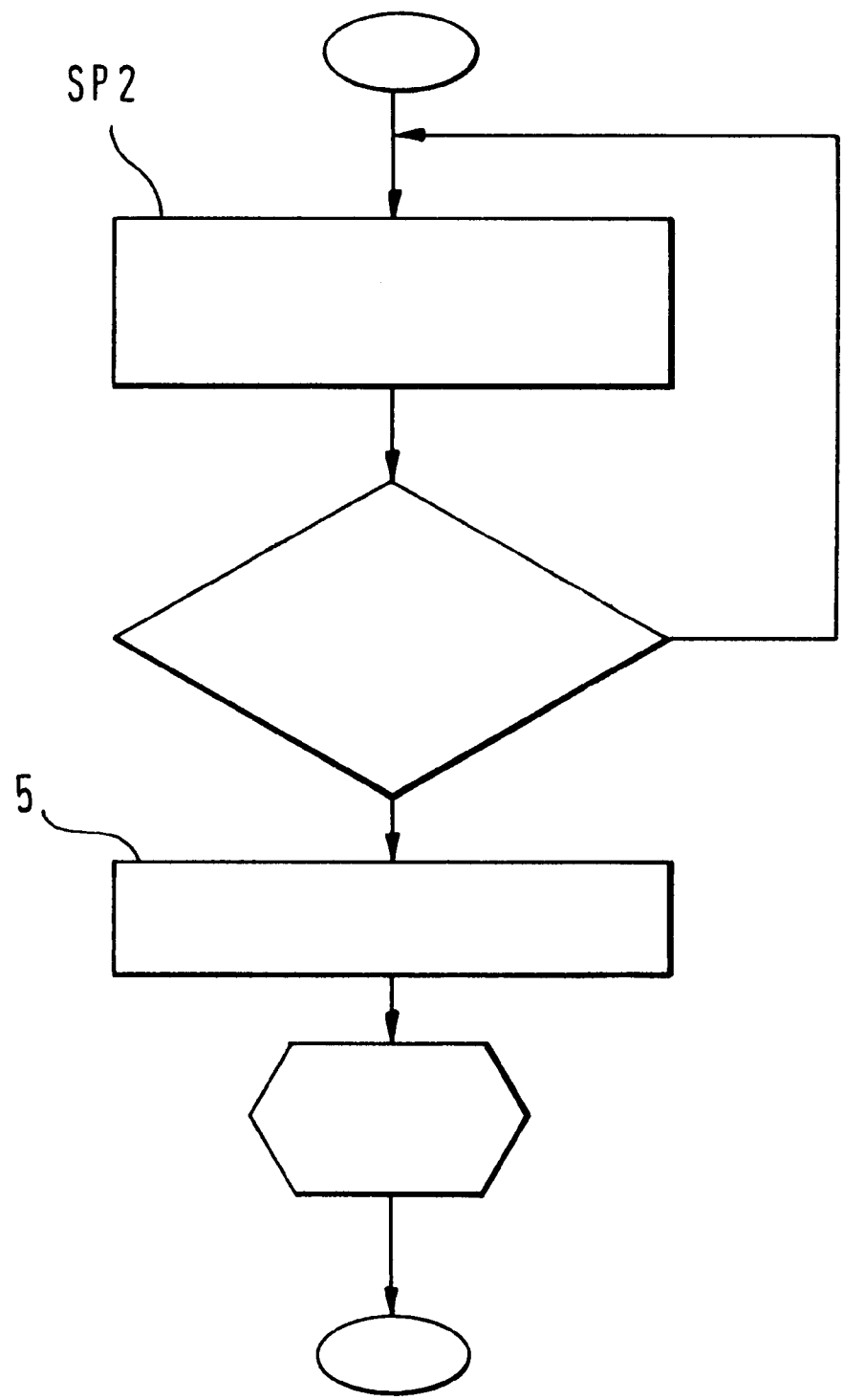

FIGS. 14 and 15 show flow diagrams for the learning mode (FIG. 14) and the dosing mode (FIG. 15) of an apparatus according to the invention of the type according to FIGS. 1, 7, 13 (alternative 1 of the memory input means 9).

The underlying operation sequence for the learning mode of FIG. 14 is contained in Table 8, line 4 as:

| (M) | → | (6) | → | (5) | → | (5) | → | (SP) |
|---|---|---|---|---|---|---|---|---|
| $L_E$ | | | | ON | | OFF | | $L_E$ |

The operation sequence for the dosing mode underlying FIG. 15 is also contained in Table 8, line 4:

| (SP) | → | (5) | (OFF, automatically) |
|---|---|---|---|
| | | ON | |

The flow diagrams of FIGS. 14 and 15 implement those operation sequences.

According to another preferred embodiment of the invention the control unit 8 is formed such that it closes the shut-off device 7 and/or the safety shut-off device 15 after the detection of a continuous discharge of fluid 1 during a given time after the opening of the shut-off device 7 effected by the operation means 5 and/or the memory input means 9 and/or after the passage of a given maximum dosing mass of fluid 1 and outputs an optical and/or acoustic error signal via the output unit 21 in this case.

According to another advantageous variant of the apparatus of the invention the control unit 8 is formed such that in the memories or memory locations allocated to the storage location elements (SP1, SP2, SP3, . . . ) or storage allocation elements (MSP1, MSP2, MSP3, . . . ) of the memory input means 9 pre-set dosing amounts which can be rewritten in the learning mode and may be reactivated in case of a failure of the current supply or buffer batteries and/or on operation of a reset or clear means are stored in advance by the manufacturer.

It becomes obvious from the above description that the present invention concerns an absolutely innovative and extremely widely applicable concept of a learning metering apparatus and of a method for a repeatable dosing of fluids in selectable amounts which may be learned.

SUMMARY

The invention relates to a method and an apparatus for a repeatable dosing or metering of fluids and in particular liquids in a selectable and reproducible amount in which the fluid amount to be dosed is learned in a dosing operation effected manually once and stored in a retrievable way.

The apparatus comprises a fluid line 2 for a fluid 1 including a fluid inlet 3 and a fluid outlet 4 between which a shut-off device 7 controlled by a control unit 8 is provided, an operation means 5 and a memory input means 9 (M, SP). The system is formed such that via the operation means 5 and/or the memory input means 9 a learning mode is initiated and that by once pre-dosing a corresponding quantity information is stored and that by operating the memory input means 9 a dosing mode is initiated in which the fluid amount corresponding to the stored quantity information is dosed by the shut-off device 7.

What is claimed is:

1. Apparatus for the reproducible dosage of a fluid (1) in an amount which can be predetermined, comprising:

a fluid line (2) comprising a fluid inlet (3) and a fluid outlet (4), a shut-off device (7) provided in the fluid line (2) between the fluid inlet (3) and the fluid outlet (4), and allowing to switch the flow of a fluid (1) on and off, an electronic control and detection unit (8) controlling the shut-off device (7), operating means (5) connected to the control and detection unit (8) and delivering signals to the control and detection unit (8) upon operation by an operator, whereupon the control and detection unit (8) closes the shut-off device (7), and input means connected to the control and detection unit (8) for putting in input information by an operator concerning the amount of fluid (1) to be dosed, characterized in that the input means are input and memory means (9) (M, SP; MSP) delivering signals to the control and detection unit (8), or receiving signal information to be stored from the control and detection unit (8) and the control and detection unit (8) is designed such that it, (A) upon one single manual dosing of a fluid amount by an operator by operating the operation means (5) and/or the input and memory means (9) (M, SP; MSP)

in a predetermined order in a learning mode initiated thereby, determines the amount of fluid (1) discharged from the fluid outlet (4) between the opening (ON) of the shut-off device (7) effected via the operation means (5) and/or the input and memory means (9) (M, SP; MSP) and the subsequent closing (OFF) of the shut-off device (7) effected via the operation means (5) and/or the input and memory means (9) (M, SP; MSP)

as an amount information corresponding to that amount, and stores it as learned amount information in a memory allocated to the input and memory means (9) (M, SP; MSP), the learning mode being terminated after the amount information has been stored, and, (B) upon invocation of a learned amount information through operation of the input and memory means (9) (M, SP; MSP), optionally in combination with an operation of the operation means (5), changes over into a dosing mode, during which the learning mode is blocked and the memory is not overwritable, and opens the shut-off device (7) (ON) and closes it (OFF) in a controlled manner such that the amount of fluid (1) discharged from the fluid outlet (4) between the opening (ON) and the subsequent closing (OFF) of the shut-off device (7) corresponds to the amount information previously learned and stored in the memory in the learning mode, the dosing mode being terminated with the closing of the shut-off device (7), wherein the control and detection unit (8), the operation means (5) and the input and memory means (9) (M, SP) are designed such that for the learning mode one of the functional combinations of operations of the operation means (5) and/or of the input and memory means (9), (M,SP) at learning start and learning end listed off in the following function table is realized:

| Operation(s) | | | | | |
|---|---|---|---|---|---|
| at learning start | | | at learning end | | |
| (5) | (M) | (SP) | (5) | (M) | (SP) |
| 0 | 1 | 0 | 0 | 0 | 1 |
| 0 | 1 | 0 | 1 | 0 | 1 |
| 0 | 0 | 1 | 0 | 1 | 0 |
| 0 | 0 | 1 | 0 | 1 | 1 |
| 0 | 0 | 1 | 1 | 1 | 0 |
| 0 | 0 | 1 | 1 | 1 | 1 |
| 0 | 1 | 1 | 1 | 0 | 0 |
| 1 | 1 | 0 | 0 | 0 | 1 |
| 1 | 1 | 0 | 1 | 0 | 1 |
| 1 | 0 | 1 | 0 | 1 | 0 |
| 1 | 0 | 1 | 1 | 1 | 0 |
| 1 | 1 | 1 | 1 | 0 | 0 |
| 1 | 0 | 0 | 0 | 1 | 1 |
| 1 | 0 | 0 | 1 | 1 | 1. |

2. Apparatus according to claim 1, characterized in that the input and memory means (9) comprise a memory command element (M) and one or more storage location elements (SP; SP1, SP2, SP3, . . . ) connected to the control and detection unit (8), wherein the memory command element (M) delivers upon operation a signal to the control and detection unit (8) which is used in the learning mode for generating a memory command, and optionally for initiating the learning start ($L_B$) and optionally for defining the learning end ($L_E$) and the storage location elements (SP; SP1, SP2, SP3, . . . ) deliver signals upon operation in the learning mode to the control and detection unit (8) which are used for allocating an amount information learned or to be learned in the learning mode to the respective storage location element and/or for initiating the dosing start in the dosing mode.

3. Apparatus according to claim 1, characterized in that the input and memory means (9) consist of storage allocation elements (MSP; MSP1, MSP2, MSP3, . . . ) which, upon operation, deliver signals to the control and detection unit (8) which are used both for generating a memory command, and optionally for initiating the learning start ($L_B$), and for effecting an allocation of an amount information learned or to be learned in the learning mode to the respective storage location element, and optionally for defining the learning end ($L_E$) and/or for initiating the dosing start in the dosing mode.

4. Apparatus according to claim 2, characterized in that a control and detection unit (8) is designed such that it, (A) upon operation of the operation means (5) and/or the input and memory means (9) (M, SP; MSP)

turns into the learning mode and determines the amount of fluid (1) discharged from the fluid outlet (4) between the opening (ON) of the shut-off device (7) effected via the operation means (5) or the input and memory means (9) (M, SP; MSP), respectively, and the subsequent closing (OFF) of the shut-off device (7) effected via the operation means (5) and/or the input and memory means (9) (M, SP; MSP) as an amount information corresponding to that amount, and stores it as learned amount information in a memory allocated to the respective storage location element (SP1, SP2, SP3, . . . ) or the respective storage allocation element (MSP1, MSP2, MSP3, . . . ) upon operation of a storage location element (SP1, SP2, SP3, . . . ) of the input and memory means (9), (M, SP) or of a storage allocation element (MSP1, MSP2, MSP3, . . . ) of the input and memory means (9) (MSP), respectively, and, (B) upon—optionally renewed—operation of the storage location element (SP1, SP2, SP3, . . . ) of the input and memory means (9) (M, SP) or the storage allocation element (MSP1, MSP2, MSP3, . . . ) of the input and memory means (9) (MSP), optionally in combination with an operation of the operation means (5), changes over into the dosing mode and opens the shut-off device (7) (ON) and closes it (OFF) in a controlled manner such that the amount of fluid (1) discharged from the fluid outlet (4) between the opening (ON) and the subsequent closing (OFF) of the shut-off device (7) corresponds to the amount of information previously learned and stored in the memory in the learning mode.

5. Apparatus according to claim 1, characterized in that the shut-off device (7) is a flow switch which can take only the fully open state or the fully closed state, particularly a solenoid valve.

6. Apparatus according to claim 1, characterized in that the shut-off device (7) is a flow switch register consisting of two or more flow switches (7', 7", 7'") connected in parallel and/or of two or more independent flow switches (7',7", 7'"), particularly solenoid valves, having a common fluid outlet (4) and optionally also a common or partially common fluid inlet (3; 3', 3"), wherein each of the flow switches (7', 7", 7'") of the flow switch register is capable of being controlled by the control and detection unit (8).

7. Apparatus according to claim 1, characterized in that the shut-off device (7) is a flow control element which is continuously or stepwise adjustable between the fully open state and the fully closed state via an actuator drive (11) controllable through the control and detection unit (8), particularly a butterfly valve, a sliding valve or another type of valve such as a three-way or four-way mixing valve.

8. Apparatus according to claim 1, characterized in that it comprises a flow rate input element (6) which, upon operation, delivers signals to the control and detection unit (8) which controls the shut-off device (7) in dependence of the input such that a fluid flow rate (V) (volume/time) results which corresponds to the input desired flow rate.

9. Apparatus according to claim 8, characterized in that the control and detection unit (8) is designed such that the flow rate input element (6) includes the ON function of the operation means (5) which serves for opening the shut-off device (7).

10. Apparatus according to claim 1, characterized in that the control and detection unit (8) is designed such that the storage location elements (SP1, SP2, SP3, . . . ) of the input and memory means (9) (M, SP) or the storage allocation elements (MSP1, MSP2, MSP3, . . . ) of the input and memory means (9) (MSP) include the OFF function of the operation means (5) which serves for closing the shut-off device (7).

11. Apparatus according to claim 1, characterized in that the shut-off device (7) consists of at least two shut-off devices (7', 7") comprising actuator drives (11', 11") controlled by the control and detection unit (8), each of the shut-off devices (7', 7") having its inlet connected to one of at least two fluid inlets (3', 3") for at least two different fluids (1', 1") and having its outlet connected to the fluid outlet (4).

12. Apparatus according to claim 7, characterized in that a three-way mixer or a four-way mixer (16) is provided in the fluid line (2) upstream of the shut-off device (7), the three-way or four-way mixer (16) having its inlet connected to two or three fluid inlets (3', 3"), respectively, and having its outlet connected to the shut-off device (7).

13. Apparatus according to claim 1, characterized in that it comprises a safety shut-off device (15) provided between the shut-off device (7) and the fluid outlet (4), the safety shut-off device (15) being a flow switch or a flow control element which is adjustable continuously or stepwise between the fully open state and the fully closed state through an actuator drive (24) controllable by the control and detection unit (8), particularly a solenoid valve.

14. Apparatus according to claim 1, characterized in that it comprises nonreturn valve means (20) provided downstream of each of the fluid inlets (3; 3', 3") and preferably upstream of the shut-off device (7) and more preferably directly connected to the shut-off device (7), preferably a check valve or a flap valve.

15. Apparatus according to claim 1, characterized in that the control and detection unit (8) is designed such that the shut-off device (7) can be manually opened (ON) and closed again (OFF) via the operation means (5) as a conventional flow switch or as a conventional flow control element, without operation of a storage location element (SP1, SP2, SP3, . . . ) or of a storage allocation element (MSP1, MSP2, MSP3, . . . ).

16. Apparatus according to claim 1, characterized in that it comprises a flow rate sensor (25) provided downstream of the shut-off device (7) and connected to the control and detection unit (8), and the control and detection unit (8) is designed such that it controls the shut-off device (7) in such a manner, preferably in the form of a closed-loop control, that the flow rate resulting in the outlet of the shut-off device (7) corresponds exactly or approximately to the desired flow rate, wherein the control and detection unit (8) uses the output signal of the flow rate sensor (25) as a signal corresponding to the instantaneous flow rate of the fluid (1) delivered to the fluid outlet (4) and compares it with a signal put in via a flow rate input element (6) corresponding to the desired flow rate.

17. Apparatus according to claim 1, characterized in that the control and detection unit (8) is a microprocessor system which comprises a central processing unit (CPU), a read-only memory (ROM), a read-write memory (RAM) and an interface (I/O unit).

18. Apparatus according to claim 17, characterized in that the read-only memory (ROM) and/or the read-write memory (RAM) comprises at least one map wherein control values for controlling the shut-off device (7) and optionally of the safety shut-off device (15) allocated to the temperature (T1, T2) and/or to the flow rate and/or to the time are stored.

19. Apparatus according to claim 1, characterized in that the operation means (5) are means for contactless presence-depending control or proximity control, respectively, which are based on the principle of light barrier using visible light or infrared light, passive infrared detection, ultrasound detection, the radar principle or the application of microwaves and are controlled by the control and detection unit (8).

20. Apparatus according to claim 1, characterized in that it comprises an output unit (21) which is controlled by the control and detection unit (8) and is designed as optical display and/or as acoustic output means, particularly, voice output means, and/or as printer.

21. Apparatus according to claim 1, characterized in that the operation means (5) and/or the input and memory means (9) are adapted through the control and detection unit (8) for performing interactive operation with a user and are preferably voice-controlled.

22. Apparatus according to claim 20, characterized in that the output unit (21) is designed as voice output means and further comprises a microphone for voice or sound detection or recording, and the control and detection unit (8) is designed such that it evaluates the signals from the microphone for voice or sound recognition and, upon reception of specific or predetermined voice or sound signals, controls the operation means (5) and/or the input and memory means (9) in a learning mode or in a dosing mode.

23. Apparatus according claim 1, characterized in that it is designed for water or aqueous solutions, particularly for water for domestic or industrial use, non-aqueous solvents or solutions, dispersions or emulsions or for gases or aerosols as fluids (1).

24. Apparatus according to claim 1, characterized in that it comprises a temperature input element (10) for the input of desired temperature values which is connected to the control and detection unit (8), and the control and detection unit (8) controls the actuator drives (11', 11", 17) of mixing means (7', 7"; 16) the inlets of which are connected to fluid sources for fluids (1', 2") of different temperatures, in an open-loop or closed-loop control such that a mixed fluid of the set temperature results at the fluid outlet (4).

25. Apparatus according to claim 1, characterized in that it comprises an operating board (12) wherein the operation means (5) and/or the input and memory means (9) (M, SP; MSP) and/or the flow rate input element (6) and/or the temperature input element (10) are provided, and which optionally also comprises the output unit (21).

26. Apparatus according to claim 25, characterized in that the operation means (5), the flow rate input element (6), the input and memory means (9) and/or the temperature input element (10) provided in the operating board comprise keys, and particularly membrane or pressure-sensitive keys or piezo keys.

27. Apparatus according to claim 25, characterized in that the operating elements of the operating board (12) are marked in embossed printing and particularly in Braille.

28. Apparatus according to claim 25, characterized in that the power supply of the operating board (12) is via solar cells (22) integrated therein.

29. Apparatus according to claim 28, wherein the data transmission between the operating board (12) and the control and detection unit (8) is effected in a cordless manner, particularly through optical data transmission in the visible range or the infrared range of the spectrum or through data transmission via radio communication.

30. Apparatus according to claim 13, characterized in that the control unit is designed such that in the learning mode as well as in the dosing mode, at the start of a dosing procedure upon operation of the operation means (5) and/or of the input and memory means (9), at first the safety shut-off device (15) and subsequently the shut-off device (7) are opened, and when terminating a dosing operation, at first the shut-off device (7) and subsequently the safety shut-off device (15) are closed.

31. Apparatus according to claim 1, characterized in that the control and detection unit (8) is designed such that it signalizes the learning mode and/or the dosing mode optically and/or acoustically through suitable means of the output unit (21).

32. Apparatus according to claim 1, characterized in that the control unit is designed such that it closes the shut-off device (7) and/or the safety shut-off device (15) if a continuous discharge of fluid (1) has been detected over a predetermined time period after the opening of the shut-off device (7) initiated via the operation means (5) and/or the input and memory means (9) and/or after a predetermined maximal dosage volume or a predetermined maximal dosage mass of fluid (1) has been exceeded, the control and detection unit (8) preferably initiating or releasing in this case an optical and/or acoustical error signal through the output unit (21).

33. Apparatus according to claim 20, characterized in that the control and detection unit (8) is designed such that the dosing amount stored in the learning mode is displayed in the dosing mode or permanently by the output unit (21), preferably in the operating board (12), in the form of a physical quantity, particularly as a volume or as a mass.

34. Apparatus according to claim 1, characterized in that the control and detection unit (8) is designed such that in the memories or memory areas allocated to the storage location elements (SP1, SP2, SP3, . . . ), or to the storage allocation elements (MSP1, MSP2, MSP3, . . . ) of the input and memory means (9) dosing amounts predetermined by the manufacturer have been stored in advance which are overwritable in the learning mode and which are reactivatable when the power supply or floating batteries fail and/or when reset or clear means are operated.

35. Apparatus according to claim 16, characterized in that the flow rate sensor (25) is an absolute-type flow rate sensor, and the electronic control and deflection unit (8) is designed such that it checks or rechecks and, if necessary, corrects control data, which are preferably stored in one or several maps, after a predetermined number of dosing operations at a further dosing operation, on the basis of the signal from the flow rate sensor (25), and updates the stored values.

36. Apparatus according to claim 1, characterized in that it is designed as a sanitary tap, particularly a kitchen tap, washbasin tap, bath tub tap or shower tap, or corresponding fittings, or is integrated in a fluid line system.

37. Apparatus for the reproducible dosage of a fluid (1) in an amount which can be predetermined, comprising:

a fluid line (2) comprising a fluid inlet (3) and a fluid outlet (4), a shut-off device (7) provided in the fluid line (2) between the fluid inlet (3) and the fluid outlet (4), and allowing to switch the flow of a fluid (1) on and off, an electronic control and detection unit (8) controlling the shut-off device (7), operating means (5) connected to the control and detection unit (8) and delivering signals to the control and detection unit (8) upon operation by an operator, whereupon the control and detection unit (8) closes the shut-off device (7), and input means connected to the control and detection unit (8) for putting in input information by an operator concerning the amount of fluid (1) to be dosed, characterized in that the input means are input and memory means (9) (M, SP; MSP) delivering signals to the control and detection unit (8), or receiving signal information to be stored from the control and detection unit (8) and the control and detection unit (8) is designed such that it, (A) upon one single manual dosing of a fluid amount by an operator by operating the operation means (5) and/or the input and memory means (9) (M, SP; MSP)

in a predetermined order in a learning mode initiated thereby, determines the amount of fluid (1) discharged from the fluid outlet (4) between the opening (ON) of the shut-off device (7) effected via the operation means (5) and/or the input and memory means (9) (M, SP; MSP) and the subsequent closing (OFF) of the shut-off device (7) effected via the operation means (5) and/or the input and memory means (9) (M, SP; MSP)

as an amount information corresponding to that amount, and stores it as learned amount information in a memory allocated to the input and memory means (9) (M, SP; MSP), the learning mode being terminated after the amount information has been stored, and, (B) upon invocation of a learned amount information through operation of the input and memory means (9) (M, SP; MSP), optionally in combination with an operation of the operation means (5), changes over into a dosing mode, during which the learning mode is blocked and the memory is not overwritable, and opens the shut-off device (7) (ON) and closes it (OFF) in a controlled manner such that the amount of fluid (1) discharged from the fluid outlet (4) between the opening (ON) and the subsequent closing (OFF) of the shut-off device (7) corresponds to the amount information previously learned and stored in the memory in the learning mode, the dosing mode being terminated with the closing of the shut-off (7), characterized in that the control and detection unit (8), the operation means (5) and the input and memory means (9) (M, SP) are designed such that for the learning mode one of the combinations of operations or sequences of operations of the operation means (5) and/or of the input and memory means (9) (M, SP) at learning start and learning end listed off in the following operation table is realized:

| Operation(s) | |
|---|---|
| At learning start | At learning end |
| (M)* | (SP)* |
| $L_B$ | $L_E$ |
| ON | OFF |
| (M)* | (5)→(SP) |
| $L_B$ | OFF $L_E$ |
| ON | OFF |
| (M)* | (SP)→(5) |
| $L_B$ | $L_E$ |
| ON | OFF |
| (SP)*long | (M)* |
| $L_B$ | $L_E$ |
| ON | OFF |
| (SP)*long | (M)→(SP) |
| $L_B$ | $L_E$ |
| ON | OFF |
| (SP)*hold | (SP)→(M)* |
| $L_B$ | release $L_E$ |
| ON | OFF |
| (SP)*long | (5)→(M) |
| $L_B$ | OFF $L_E$ |
| ON | |
| (SP)*long | (M)→(5) |
| $L_B$ | $L_E$ |
| ON | OFF |

-continued

| Operation(s) | |
|---|---|
| At learning start | At learning end |
| (SP)*long<br>L_B<br>ON | (M)→(5)→(SP)<br>OFF   L_E |
| (SP)*long<br>L_B<br>ON | (M)→(SP)→(5)<br>L_E<br>OFF |
| (SP)*long<br>L_B<br>ON | (5)→(M)→(SP)<br>OFF   L_E |
| (SP)*long<br>L_B<br>ON | (5)→(SP)→(M)<br>OFF   L_E |
| (SP)*hold<br>L_B<br>ON | (SP)→(M)→(5)<br>release   L_E<br>OFF |
| (SP)*hold<br>L_B<br>ON | (SP)→(5)→(M)<br>release   OFF   LE |
| (M)→(SP)*<br>L_B   ON | (5)*<br>L_E<br>OFF |
| (SP)→(M)*<br>L_B<br>ON | (5)*<br>L_E<br>OFF |
| (5)→(M)<br>L_B<br>ON | (SP)*<br>L_E<br>OFF |
| (M)→(5)<br>L_B   ON | (SP)*<br>L_E<br>OFF |
| (5)→(M)<br>L_B<br>ON | (5)→(SP)<br>OFF   L_E |
| (5)→(M)<br>L_B<br>ON | (SP)→(5)<br>L_E<br>OFF |
| (M)→(5)<br>L_B   ON | (5)→(SP)<br>OFF   L_E |
| (M)→(5)<br>L_B   ON | (SP)→(5)<br>L_E<br>OFF |
| (5)→(SP)<br>L_B<br>ON | (M)*<br>L_E<br>OFF |
| (SP)→(5)<br>L_B   ON | (M)*<br>L_E<br>OFF |
| (5)→(SP)<br>L_B<br>ON | (5)→(M)<br>OFF   L_E |
| (5)→(SP)<br>L_B<br>ON | (M)→(5)<br>L_E<br>OFF |
| (SP)→(5)<br>L_B   ON | (5)→(M)<br>OFF   L_E |
| (SP)→(5)<br>L_B   ON | (M)→(5)<br>L_E<br>OFF |
| (M)→(SP)→(5)<br>L_B   ON | (5)*<br>L_E<br>OFF |
| (5)→(SP)→(M)<br>L_B<br>ON | (5)*<br>L_E<br>OFF |
| (5)→(M)→(SP)<br>L_B<br>ON | (5)*<br>L_E<br>OFF |
| (SP)→(M)→(5)<br>L_B ON | (5)*<br>L_E<br>OFF |
| (5)*<br>L_B<br>ON | (M)*→(SP)<br>OFF   L_E |
| (5)*<br>L_B | (SP)→(M)*<br>·L_E |
| ON<br>(5)*<br>L_B<br>ON | OFF<br>(5)→(M)→(SP)<br>OFF   L_E |
| (5)*<br>L_B<br>ON | (5)→(SP)→(M)<br>OFF   L_E |
| (5)*<br>L_B<br>ON | (M)→(5)→(SP)<br>OFF   L_E |
| (5)*<br>L_B<br>ON | (M)→(SP)→(5)<br>L_E<br>OFF |
| (5)*<br>L_B<br>ON | (SP)→(M)→(5)<br>L_E<br>OFF |
| (5)*<br>L_B<br>ON | (SP)→(5)→(M)<br>OFF   L_E | wherein are:
L_B the start of the learning mode,
L_E the end of the learning mode,
ON the opening of the shut-off device (7),
OFF the closing of the shut-off device (7),
→ the sequence of the user's operations, and
* a double function of the respective input element, i.e., its directly allocated function and a second function.

38. Apparatus for the reproducible dosage of a fluid (1) in an amount which can be predetermined, comprising:

a fluid line (2) comprising a fluid inlet (3) and a fluid outlet (4), a shut-off device (7) provided in the fluid line (2) between the fluid inlet (3) and the fluid outlet (4), and allowing to switch the flow of a fluid (1) on and off, an electronic control and detection unit (8) controlling the shut-off device (7), operating means (5) connected to the control and detection unit (8) and delivering signals to the control and detection unit (8) upon operation by an operator, whereupon the control and detection unit (8) closes the shut-off device (7), and input means connected to the control and detection unit (8) for putting in input information by an operator concerning the amount of fluid (1) to be dosed, characterized in that the input means are input and memory means (9) (M, SP; MSP) delivering signals to the control and detection unit (8), or receiving signal information to be stored from the control and detection unit (8) and the control and detection unit (8) is designed such that it, (A) upon one single manual dosing of a fluid amount by an operator by operating the operation means (5) and/or the input and memory means (9) (M, SP; MSP)

in a predetermined order in a learning mode initiated thereby, determines the amount of fluid (1) discharged from the fluid outlet (4) between the opening (ON) of the shut-off device (7) effected via the operation means (5) the input and memory means (9) (M, SP; MSP) and the subsequent closing (OFF) of the shut-off device (7) effected via the operation means (5) and/or the input and memory means (9) (M, SP; MSP)

as an amount information corresponding to that amount, and stores it as learned amount information in a memory allocated to the input and memory means (9) (M, SP; MSP), the learning mode being terminated after the amount information has been stored, and, (B) upon invocation of a learned amount information through operation of the input and memory means (9) (M, SP; MSP), optionally in combination with an operation of the operation means (5), changes over into a dosing mode, during which the learning mode is blocked and the memory is not overwritable, and opens the shut-off device (7) (ON) and closes it (OFF) in a controlled manner such that the amount of fluid (1) discharged from the fluid outlet (4) between the opening (ON) and the subsequent closing (OFF) of the shut-off device (7) corresponds to the amount information previously learned and stored in the memory in the learning mode, the dosing mode being terminated with the closing of the shut-off device (7), characterized in that the control and detection unit (8), the operation means (5) and the input and memory means (9) (MSP) are designed such that for the learning mode one of the functional combinations of operations of the operation means (5) and/or of the input and memory means (9) (MSP) at learning start and learning end listed off in the following function table is realized:

| Operation(s) | | | |
| --- | --- | --- | --- |
| At learning start | | At learning end | |
| (5) | (MSP) | (5) | (MSP) |
| 1 | 0 | 0 | 1 |
| 1 | 0 | 1 | 1 |
| 0 | 1 | 0 | 1 |
| 0 | 1 | 1 | 0 |
| 0 | 1 | 1 | 1 |
| 1 | 1 | 0 | 1 |
| 1 | 1 | 1 | 0 |
| 1 | 1 | 1 | 1 |

39. Apparatus for the reproducible dosage of a fluid (1) in an amount which can be predetermined, comprising:

a fluid line (2) comprising a fluid inlet (3) and a fluid outlet (4), a shut-off device (7) provided in the fluid line (2) between the fluid inlet (3) and the fluid outlet (4), and allowing to switch the flow of a fluid (1) on and off, an electronic control and detection unit (8) controlling the shut-off device (7), operating means (5) connected to the control and detection unit (8) and delivering signals to the control and detection unit (8) upon operation by an operator, whereupon the control and detection unit (8) closes the shut-off device (7), and input means connected to the control and detection unit (8) for putting in input information by an operator concerning the amount of fluid (1) to be dosed, characterized in that the input means are input and memory means (9) (M, SP; MSP) delivering signals to the control and detection unit (8), or receiving signal information to be stored from the control and detection unit (8) and the control and detection unit (8) is designed such that it (A) upon one single manual dosing of a fluid amount by an operator by operating the operation means (5) and/or the input and memory means (9) (M, SP; MSP)

in a predetermined order in a learning mode initiated thereby, determines the amount of fluid (1) discharged from the fluid outlet (4) between the opening (ON) of the shut-off device (7) effected via the operation means (5) and/or the input and memory means (9) (M, SP; MSP) and the subsequent closing (OFF) of the shut-off device (7) effected via the operation means (5) and/or the input and memory means (9) (M, SP; MSP)

as an amount information corresponding to that amount, and stores it as learned amount information in a memory allocated to the input and memory means (9) (M, SP; MSP), the learning mode being terminated after the amount information has been stored, and, (B) upon invocation of a learned amount information through operation of the input and memory means (9) (M, SP; MSP), optionally in combination with an operation of the operation means (5), changes over into a dosing mode, during which the learning mode is blocked and the memory is not overwritable, and opens the shut-off device (7) (ON) and closes it (OFF) in a controlled manner such that the amount of fluid (1) discharged from the fluid outlet (4) between the opening (ON) and the subsequent closing (OFF) of the shut-off device (7) corresponds to the amount information previously learned and stored in the memory in the learning mode, the dosing mode being terminated with the closing of the shut-off device (7), characterized in that the control and detection unit (8), the operation means (5) and the input and memory means (9) (MSP) are designed such that for the learning mode one of the combinations of operations or sequences of operations of the operation means (5) and/or of the input and memory means (9) (MSP) at learning start and learning end listed off in the following operation table is realized:

| Operation(s) | |
| --- | --- |
| At learning start | At learning end |
| (5)* | (MSP)* |
| $L_B$ | $L_E$ |
| ON | OFF |
| (5)* | (5)→(MSP) |
| $L_B$ | OFF $L_E$ |
| ON | |
| (5)* | (MSP)→(5) |
| $L_B$ | $L_E$ |
| ON | OFF |
| (MSP)*long | (MSP)* |
| $L_B$ | $L_E$ |
| ON | OFF |
| (MSP)* | (5)* |
| $L_B$ | $L_E$ |
| ON | OFF |
| (MSP)* | (5)→(MSP) |
| $L_B$ | OFF $L_E$ |
| ON | |

-continued

| Operation(s) | |
|---|---|
| At learning start | At learning end |
| (MSP)* | (MSP)→(5) |
| $L_B$ | $L_E$ |
| ON | OFF |
| (5)→(MSP) | (MSP)* |
| $L_B$ | $L_E$ |
| ON | OFF |
| (MSP)hold→(5) | (MSP)*release |
| $L_B$    ON | $L_E$ |
|  | OFF |
| (5)→(MSP) | (5)* |
| $L_B$ | $L_E$ |
| ON | OFF |
| (MSP)→(5) | (5)* |
| $L_B$    ON | $L_E$ |
|  | OFF |
| (5)→(MSP) | (5)→(MSP) |
| $L_B$ | OFF   $L_E$ |
| ON |  |
| (5)→(MSP) | (MSP)→(5) |
| $L_B$ | $L_E$ |
| ON | OFF |
| (MSP)→(5) | (5)→(MSP) |
| $L_B$    ON | OFF   $L_E$ |
| (MSP)→(5) | (MSP)→(5) |
| $L_B$    ON | $L_E$ |
|  | OFF |
| (5)*long | (MSP) |
| $L_B$    ON | $L_E$ |
|  | OFF | wherein are:
$L_B$ the start of the learning mode,
$L_E$ the end of the learning mode,
ON the opening of the shut-off device (7),
OFF the closing of the shut-off device (7),
→ the sequence of the user's operations, and
* a double function of the respective input element, i.e., its directly allocated function and a second function.

40. Method for the reproducible dosage of a fluid (1) in an amount which can be predetermined, by means of a shut-off device (7) provided in a fluid line (2) comprising a fluid inlet (3) and a fluid outlet (4) and being controllable by an electronic control and detection unit (8) which, upon input of an input information corresponding to the selected amount of fluid (1) to be dosed, opens the shut-off device (7) and closes it again after the selected amount of fluid (1), which is stored as corresponding amount information in the control and detection unit (8), has been discharged from the fluid outlet (4), characterized in that (A) for producing the amount information stored in the control and detection unit (8)

a learning mode of the control and detection unit (8) is initiated ($L_B$) by putting in an input information (5; M, SP; MSP) to the control and detection unit (8) through operation of operation means (5) and/or through operation of input and memory means (9) (M, SP, MSP) in a predetermined order or by effecting the opening of the shut-off device (7) by an operator, the control and detection unit (8) detects and stores during the learning mode the amount of fluid (1) discharged from the fluid outlet (4) as an amount information corresponding to that amount, and the learning mode is determined ($L_E$) by the control unit (8) through the subsequent closing of the shut-off device (7) effected by an operator, and (B) for repeatably dosing the fluid (1) in an amount corresponding to the amount information stored in the control and detection unit (8)

a dosing mode of the control and detection unit (8) is initiated by putting in an input information (SP; MSP) to the control and detection unit (8), optionally in combination with an operation of the operation means (5), thereupon the shut-off device (7) is opened by the control and detection unit, the control and detection unit (8) again closes the shut-off device (7) if an amount of fluid (1) has been discharged from the fluid outlet (4) which corresponds to the respective amount information stored in the learning phase, and the dosing mode is terminated with the closing of the shut-off device (7) wherein for the learning mode, one of the function combinations of input information (5; M, SP) at learning start and learning end listed off in the following function table is used:

| Operation(s) | | | | | |
|---|---|---|---|---|---|
| at learning start | | | at learning end | | |
| (5) | (M) | (SP) | (5) | (M) | (SP) |
| 0 | 1 | 0 | 0 | 0 | 1 |
| 0 | 1 | 0 | 1 | 0 | 1 |
| 0 | 0 | 1 | 0 | 1 | 0 |
| 0 | 0 | 1 | 0 | 1 | 1 |
| 0 | 0 | 1 | 1 | 1 | 0 |
| 0 | 0 | 1 | 1 | 1 | 1 |
| 0 | 1 | 1 | 1 | 0 | 0 |
| 1 | 1 | 0 | 0 | 0 | 1 |
| 1 | 1 | 0 | 1 | 0 | 1 |
| 1 | 0 | 1 | 0 | 1 | 0 |
| 1 | 0 | 1 | 1 | 1 | 0 |
| 1 | 1 | 1 | 1 | 0 | 0 |
| 1 | 0 | 0 | 0 | 1 | 1 |
| 1 | 0 | 0 | 1 | 1 | 1 |

41. Method according to claim 40, characterized in that the control and detection unit (8) blocks the memory wherein the amount information is stored, against overwriting or erasing during the dosing mode.

42. Method according to claim 40, characterized in that if a safety shut-off device (15) is provided between the shut-off device (7) and the fluid outlet (4), the safety shut-off device (15) is opened at the start of a dosing operation in the learning mode as well as in the dosing mode prior to the opening of the shut-off device (7), and is closed at the termination of the dosing operation after the closing of the shut-off device (7).

43. Method according to claim 40, characterized in that the shut-off device (7) is opened and closed in accordance with a two-position control without intermediate opening states.

44. Method according to claim 40, characterized in that the shut-off device (7) is controlled for opening during a predetermined time period or in predetermined steps stepwise or continuously from the closed state into the open state, and for closing, the shut-off device (7) is controlled during a predetermined time period or in predetermined steps stepwise or continuously from the open state into the closed state.

45. Method according to claim 40, characterized in that the amount information is generated through a time measurement of the time period between the opening and the subsequent closing of the shut-off device (7).

46. Method according to claim 40, characterized in that the amount information is generated at a constant flow rate and/or at a constant pressure of the fluid (1).

47. Method according to claim 40, characterized in that the amount information is generated by means of a measurement of the flow or flow rate of the fluid (1) through the fluid line (2) between the opening and the subsequent closing of the shut-off device (7).

48. Method according to claim 45, characterized in that the amount information is generated by correcting the signals or data corresponding to the flow time or flow rate regarding the temperature and/or the density and/or the viscosity and/or the pressure of the fluid (1).

49. Method according to claim 40, characterized in that the amount information is determined by the electronic control and detection unit (8) in the form of a relative amount or in the form of an absolute amount and is printed out and/or displayed optically and/or acoustically and/or put out through voice output via an output unit (21).

50. Method according to claim 40, characterized in that an absolute operating flow rate sensor (25) is used for the determination of the flow rate of the fluid (1), and the electronic control and detection unit (8) checks or re-checks, and, if necessary, corrects stored control data after a predetermined number of dosing operations at a further dosing operation on the basis of the signal from the flow rate sensor (25), and updates the stored amount information values accordingly.

51. Method according to claim 40, characterized in that the input information is transmitted to the control and detection unit (8) in a cordless manner, particularly through optical data transmission in the visible range or the infrared range of the spectrum or through data transmission via radio communication.

52. Method according to claim 40, characterized in that the shut-off device (7) and/or the safety shut-off device (15) are closed by the control and detection unit (8) if device (7) and/or the safety shut-off device (15) if a permanent discharge of fluid (1) has been detected over a predetermined time period after the opening of the shut-off device (7) and/or after a predetermined maximal dosage volume or a predetermined maximal dosage mass of fluid (1) has been exceeded, the control and detection unit (8) preferably initiating releasing in this case an optical and/or acoustical error signal through the output unit (21).

53. Method for the producible dosage of a fluid (1) in an amount which can be predetermined, by means of a shut-off device (7) provided in a fluid line (2) comprising a fluid inlet (3) and a fluid outlet (4) and being controllable by an electronic control and detection unit (8) which, upon input of an input information corresponding to the selected amount of fluid (1) to be dosed, opens the shut-off device (7) and closes it again after the selected amount of fluid (1), which is stored as corresponding amount information in the control and detection unit (8), has been discharged from the fluid outlet (4), characterized in that (A) for producing the amount information stored in the control and detection unit (8)

a learning mode of the control detection unit (8) is initiated ($L_B$) by putting in an input information (5; M, SP; MSP) to the control and detection unit (8) through operation of operation means (5) and/or through operation of input and memory means (9) (M, SP, MSP) in a predetermined order or by effecting the opening of the shut-off device (7) by an operator, the control and detection unit (8) detects and stores during the learning mode the amount of fluid (1) discharged from the fluid outlet (4) as an amount information corresponding to that amount, and the learning mode is determined ($L_E$) by the control unit (8) through the subsequent closing of the shut-off device (7) effected by an operator, and (B) for repeatably dosing the fluid (1) in an amount corresponding to the amount information stored in the control and detection unit (8)

a dosing mode of the control and detection unit (8) is initiated by putting in an input information (SP; MSP) to the control and detection unit (8), optionally in combination with an operation of the operation means (5), thereupon the shut-off device (7) is opened by the control and detection unit, the control and detection unit (8) again closes the shut-off device (7) if an amount of fluid (1) has been discharged from the fluid outlet (4) which corresponds to the respective amount information stored in the learning phase, and the dosing mode is terminated with the closing of the shut-off device (7), characterized in that for the learning mode, one of the combinations of input information (5; M, SP) at learning start and learning end listed off in the following operation table is used:

| input information | |
|---|---|
| At learning start | at learning end |
| (M)* | (SP)* |
| $L_B$ | $L_E$ |
| ON | OFF |
| (M)* | (5)→(S) |
| $L_B$ | OFF $L_E$ |
| ON | |
| (M)* | (SP)→(5) |
| $L_B$ | $L_E$ |
| ON | OFF |
| (SP)*long | (M)* |
| $L_B$ | $L_E$ |
| ON | OFF |
| (SP)*long | (M)→(SP) |
| $L_B$ | $L_E$ |
| ON | OFF |
| (SP)*long | (SP)→(M)* |
| $L_B$ | release $L_E$ |
| ON | OFF |
| (SP)*long | (5)→(M) |
| $L_B$ | OFF $L_E$ |
| ON | |
| (SP)*long | (M)→(5) |
| $L_B$ | $L_E$ |
| ON | OFF |
| (SP)*long | (M)→(5)→(SP) |
| $L_B$ | OFF $L_E$ |
| ON | |
| (SP)*long | (M)→(SP)→(5) |
| $L_B$ | $L_E$ |
| ON | OFF |
| (SP)*long | (5)→(M)→(SP) |
| $L_B$ | OFF $L_E$ |
| ON | |
| (SP)*long | (5)→(SP)→(M) |
| $L_B$ | OFF $L_E$ |
| ON | |
| (SP)*hold | (SP)→(M)→(5) |
| $L_B$ | release $L_E$ |
| ON | OFF |
| (SP)*hold | (SP)→(5)→(M) |
| $L_B$ | release OFF $L_E$ |
| ON | |

-continued

| input information | |
|---|---|
| At learning start | at learning end |
| (M)→(SP)* $L_B$ ON | (5)* $L_E$ OFF |
| (SP)→(M)* $L_B$ ON | (5)* $L_E$ OFF |
| (5)→(M) $L_B$ ON | (SP)* $L_E$ OFF |
| (M)→(5) $L_B$ ON | (SP)* $L_E$ OFF |
| (5)→(M) $L_B$ ON | (5)→(SP) OFF $L_E$ |
| (5)→(M) $L_B$ ON | (SP)→(5) $L_E$ OFF |
| (M)→(5) $L_B$ ON | (5)→(SP) OFF $L_E$ |
| (M)→(5) $L_B$ ON | (SP)→(5) $L_E$ OFF |
| (5)→(SP) $L_B$ ON | (M)* $L_E$ OFF |
| (SP→(5) $L_B$ ON | (M)* $L_E$ OFF |
| (5)→(SP) $L_B$ ON | (5)→(M) OFF $L_E$ |
| (5)→(SP) $L_B$ ON | (M)→(5) $L_E$ OFF |
| (SP)→(5) $L_B$ ON | (5)→(M) OFF $L_E$ |
| (SP)→(5) $L_B$ ON | (M)→(5) $L_E$ OFF |
| (M)→(SP)→(5) $L_B$ ON | (5)* $L_E$ OFF |
| (5)→(SP)→(M) $L_B$ ON | (5)* $L_E$ OFF |
| (5)→(M)→(SP) $L_B$ ON | (5)* $L_E$ OFF |
| (SP)→(M)→(5) $L_B$ ON | (5)* $L_E$ OFF |
| (5)* $L_B$ ON | (M)*→(SP) OFF $L_E$ |
| (5)* $L_B$ ON | (SP)→(M)* $L_E$ OFF |
| (5)* $L_B$ ON | (5)→(M)→(SP) OFF $L_E$ |
| (5)* $L_B$ ON | (5)→(SP)→(M) OFF $L_E$ |
| (5)* $L_B$ ON | (M)→(5)→(SP) OFF $L_E$ |
| (5)* $L_B$ ON | (M)→(SP)→(5) $L_E$ OFF |
| (5)* $L_B$ ON | (SP)→(M)→(5) $L_E$ OFF |
| (5)* $L_B$ ON | (SP)→(5)→(M) OFF $L_E$ | wherein are:
$L_B$ the start of the learning mode,
$L_E$ the end of the learning mode,
ON the opening of the shut-off device (7),
OFF the closing of the shut-Off device (7),
→ the sequence of the user's operations, and
* a double function of the respective input element, i.e., its directly allocated function and a second function.

54. Method for the reproducible dosage of fluid (1) in an amount which can be predetermined, by means of a shut-off device (7) provided in a fluid line (2) comprising a fluid inlet (3) and a fluid outlet (4) and being controllable by an electronic control and detection unit (8) which, upon input of an input information corresponding to the selected amount of fluid (1) to be dosed, opens the shut-off device (7) and closes it again after the selected amount of fluid (1), which is stored as corresponding amount information in the control and detection unit (8), has been discharged from the fluid outlet (4), characterized in that (A) for producing the amount information stored in the control and detection unit (8)

a learning mode of the control and detection unit (8) is initiated ($L_B$) by putting in an input information (5; M, SP; MSP) to the control and detection unit (8) through operation of operation means (5) and/or through operation of input and memory means (9) (M, SP, MSP) in a predetermined order or by effecting the opening of the shut-off device (7) by an operator, the control and detection unit (8) detects and stores during the learning mode the amount of fluid (1) discharged from the fluid outlet (4) as an amount information corresponding to that amount, and the learning mode is determined ($L_E$) by the control unit (8) through the subsequent closing of the shut-off device (7) effected by an operator, and (B) for repeatably dosing the fluid (1) in an amount corresponding to the amount information stored in the control and detection unit (8)

a dosing mode of the control and detection unit (8) is initiated by putting an input information (SP; MSP) to the control and detection unit (8), optionally in combination with an operation of the operation means (5), thereupon the shut-off device (7) is opened by the control and detection unit, the control and detection unit (8) again closes the shut-off device (7) if an amount of fluid (1) has been discharged from the fluid outlet (4) which corresponds to the respective amount information stored in the learning phase, and the dosing mode is terminated with the closing of the shut-off device (7), characterized in that for the learning mode, one of the functional combinations of input information (5; MSP) at learning start and learning end listed off in the following function table is used:

| input information | | | |
|---|---|---|---|
| at learning start | | at learning end | |
| (5) | (MSP) | (5) | (MSP) |
| 1 | 0 | 0 | 1 |
| 1 | 0 | 1 | 1 |
| 0 | 1 | 0 | 1 |
| 0 | 1 | 1 | 0 |
| 0 | 1 | 1 | 1 |
| 1 | 1 | 0 | 1 |
| 1 | 1 | 1 | 0 |
| 1 | 1 | 1 | 1 |

55. Method for the reproducible dosage of a fluid (1) in an amount which can be predetermined, by means of a shut-off device (7) provided in a fluid line (2) comprising a fluid inlet (3) and a fluid outlet (4) and being controllable by an electronic control and detection unit (8) which, upon input of an input information corresponding to the selected amount of fluid (1) to be dosed, opens the shut-off device (7) and closes it again after the selected amount of fluid (1), which is stored as corresponding amount information in the control and detection unit (8), has been discharged from the fluid outlet (4), characterized in that (A) for producing the amount information stored in the control and detection unit (8)

a learning mode of the control and detection unit (8) is initiated ($L_B$) by putting in an input information (5; M, SP; MSP) to the control and detection unit (8) through operation of operation means (5) and/or through operation of input and memory means (9) (M, SP, MSP) in a predetermined order or by effecting the opening of the shut-off device (7) by an operator, the control and detection unit (8) detects and stores during the learning mode the amount of fluid (1) discharged from the fluid outlet (4) as an amount information corresponding to that amount, and the learning mode is determined ($L_E$) by the control unit (8) through the subsequent closing of the shut-off device (7) effected by an operator, and (B) for repeatably dosing the fluid (1) in an amount corresponding to the amount information stored in the control and detection unit (8)

a dosing mode of the control and detection unit (8) is initiated by putting in an input information (SP; MSP) to the control and detection unit (8), optionally in combination with an operation of the operation means (5), thereupon the shut-off device (7) is opened by the control and detection unit, the control and detection unit (8) again closes the shut-off device (7) if an amount of fluid (1) has been discharged from the fluid outlet (4) which corresponds to the respective amount information stored in the learning phase, and the dosing mode is terminated with the closing of the shut-off device (7), characterized in that for the learning mode, one of the combinations of input information (5; MSP) at learning start and learning end listed off in the following operation table is used:

| input information | |
|---|---|
| at learning start | at learning end |
| (5)* | (MSP)* |
| $L_B$ | $L_E$ |
| ON | OFF |
| (5)* | (5)→(MSP) |
| $L_B$ | OFF  $L_E$ |
| ON | |
| (5)* | (MSP)→(5) |
| $L_B$ | $L_E$ |
| ON | OFF |
| (MSP)*long | (MSP)* |
| $L_B$ | $L_E$ |
| ON | OFF |
| (MSP)* | (5)* |
| $L_B$ | $L_E$ |
| ON | OFF |
| (MSP)* | (5)→(MSP) |
| $L_B$ | OFF  $L_E$ |
| ON | |
| (MSP)* | (MSP)→(5) |
| $L_B$ | $L_E$ |
| ON | OFF |
| (5)→(MSP) | (MSP)* |
| $L_B$ | $L_E$ |
| ON | OFF |
| (MSP)hold→(5) | (MSP)*release |
| $L_B$      ON | $L_E$ |
| | OFF |
| (5)→(MSP) | (5)* |
| $L_B$ | $L_E$ |
| ON | OFF |
| (MSP)→(5) | (5)* |
| $L_B$     ON | $L_E$ |
| | OFF |
| (5)→(MSP) | (5)→(MSP) |
| $L_B$ | OFF  $L_E$ |
| ON | |
| (5)→(MSP) | (MSP)→(5) |
| $L_B$ | $L_E$ |
| ON | OFF |
| (MSP)→(5) | (5)→(MSP) |
| $L_B$     ON | OFF  $L_E$ |
| (MSP)→(5) | (MSP)→(5) |
| $L_B$     ON | $L_E$ |
| | OFF |
| (5)*long | (MSP)* |
| $L_B$   ON | $L_E$ |
| | OFF | wherein are:
$L_B$ the start of the learning mode,
$L_E$ the end of the learning mode,
ON the opening of the shut-off device (7),
OFF the closing of the shut-off device (7),
→ the sequence of the user's operations, and
* a double function of the respective element, i.e., its directly allocated function and a second function.

* * * * *